United States Patent
Uehara

[19]

[11] Patent Number: 5,808,728
[45] Date of Patent: Sep. 15, 1998

[54] VEHICLE ENVIRONMENT MONITORING SYSTEM

[75] Inventor: Naohisa Uehara, Tokyo, Japan

[73] Assignee: Mitsubishi Denki Kabushiki Kaisha, Tokyo, Japan

[21] Appl. No.: 546,076

[22] Filed: Oct. 20, 1995

[30] Foreign Application Priority Data

Oct. 21, 1994 [JP] Japan ................................ 6-256706

[51] Int. Cl.$^6$ .............. G01C 3/08; B60T 7/16; B62D 1/24; G08G 1/16
[52] U.S. Cl. ............ 356/5.01; 180/169; 340/903; 340/904; 356/4.01
[58] Field of Search ............... 356/4.01, 5.01–5.15, 356/3.01–3.15, 141.1; 180/169; 340/903, 904

[56] References Cited

U.S. PATENT DOCUMENTS

| | | |
|---|---|---|
| 3,892,483 | 7/1975 | Saufferer . |
| 4,477,184 | 10/1984 | Endo .................................... 356/141.1 |
| 4,632,543 | 12/1986 | Endo .......................................... 356/5 |
| 4,700,427 | 10/1987 | Knepper ................................. 180/169 |
| 4,786,164 | 11/1988 | Kawata . |
| 4,905,151 | 2/1990 | Weiman et al. ........................ 180/169 |
| 4,936,678 | 6/1990 | Gordon et al. .......................... 356/375 |
| 4,996,468 | 2/1991 | Field et al. .............................. 318/587 |
| 5,122,796 | 6/1992 | Beggs et al. ............................ 180/169 |
| 5,371,581 | 12/1994 | Wangler et al. . |
| 5,461,357 | 10/1995 | Yoshioka et al. ....................... 340/435 |
| 5,475,494 | 12/1995 | Nishida et al. ......................... 356/4.01 |
| 5,504,480 | 4/1996 | Bourbin ................................. 340/903 |
| 5,504,569 | 4/1996 | Kato et al. ............................. 356/3.11 |
| 5,581,232 | 12/1996 | Tanaka et al. ......................... 180/169 |
| 5,600,561 | 2/1997 | Okamura ................................ 364/460 |
| 5,604,580 | 2/1997 | Uehara .................................... 356/28 |

Primary Examiner—Stephen C. Buczinski
Attorney, Agent, or Firm—Sughrue, Mion, Zinn, Macpeak & Seas, PLLC

[57] ABSTRACT

A vehicle environment monitoring system is capable of monitoring the nearly entire region around a vehicle on which the system is installed, and is protected from staining or damaging. The system includes an optical radar apparatus comprising a light transmitter for generating and irradiating a beam of light; a scanner with a reflective mirror rotatably disposed on a support shaft in an inclined manner for scanning the light beam in the surroundings of the vehicle; and a light receiver for receiving the light beam reflected from an object. The apparatus is disposed on the ceiling inside or outside the subject vehicle, or on a bumper at a front or rear corner of the vehicle.

31 Claims, 29 Drawing Sheets

VEHICLE ENVIRONMENT MONITORING SYSTEM

BACKGROUND OF THE INVENTION

1. Field of the Invention

The present invention relates to the technique for applying, for example, a vehicle laser radar apparatus to a vehicle environment monitoring system.

2. Description of the Related Art

Hithertofore, this type of optical radar apparatus using a beam of light as illustrated in FIG. 37 has been known to the inventor. In FIG. 37, the optical radar apparatus, generally designated at reference numeral 11 includes a light transmitter, generally designated at reference numeral 2, and a light receiver, generally designated at reference numeral 3. Synchronously with a clock pulse generated by a clock pulse generator 1, the light transmitter 2 comprising a pulse driver 21, a laser diode 22 and a light supplying lens 23 generates a beam of light and irradiates it to an object in the form of an obstacle 10. The light receiver 3 comprises a light-receiving lens 31 for receiving and focusing the beam of light transmitted by the light transmitter 2 and reflected from the obstacle 10, and a light-receiving element 32 whose output terminal is connected to a distance measuring means 4 for calculating the distance between the obstacle 10 and the optical radar apparatus 11.

The operation of the above-described optical radar apparatus 11 arranged in this way will be described. The clock pulse generator 1 generates a clock pulse which serves as a reference for distance measurement. Synchronously with this clock pulse, the pulse driver 21 drives the laser diode 22 to emit a beam of light. The light beam emitted from the laser diode 22 is collected by the light supplying lens 23 and irradiated forward in the irradiation range lying within a predetermined angular range. This beam of light is reflected if there is an obstacle 10 in the irradiation range. The light receiving lens 31 collects the beam of light reflected from this obstacle 10 onto the light receiving surface of the light receiving element 32. The light receiving element 32 converts a reflected light into an electric signal through photoelectric conversion and supplies the obtained signal to the distance measuring means 4. By comparing an electric signal from the light receiving element 32 with a predetermined threshold, the distance measuring means 4 detects the electric signal derived from the beam of light reflected from the obstacle 10. Furthermore, the distance measuring means 4 measures a propagation delay time from the clock pulse generation time at which the clock pulse generator I generates a clock pulse i.e., the driving time of the laser diode 22, to the reflected light detection time at which the light receiving element 32 receives the reflected light, for example, by using a high-frequency oscillator and a high-speed counter but also calculates the distance between the obstacle 10 and the optical radar apparatus 11 on the basis of the propagation delay time in accordance with the following formula:

$$\text{Distance} = \text{Light Velocity} \times \text{Round-Trip Time} \div 2 \quad (1)$$

where the round-trip time is the aforesaid propagation delay time.

Next, a vehicle environment monitoring system using the above-mentioned optical radar apparatus will be described. FIG. 38 illustrates one example of such a conventional vehicle environment monitoring system. The vehicle environment monitoring system is installed on a vehicle 12 and comprises an optical radar apparatus 11a for monitoring the frontward direction of the vehicle, an optical radar apparatus 11b for monitoring the left-side direction of the vehicle, an optical radar apparatus 11c for monitoring the right-side direction of the vehicle, an optical radar apparatus 11d for monitoring the left-rear-side direction of the vehicle, an optical radar apparatus 11e for monitoring the right-rear-side direction of the vehicle, and an optical radar apparatus 11f for monitoring the rearward direction of the vehicle.

The optical radar apparatus 11 a is used to generate a vehicle distance alarm for notifying the driver of the vehicle of an increase in the danger of collision, for example, when vehicle distance to the front vehicle has become less than a safe vehicle distance in the own vehicle 12. Also, the optical radar apparatus 11a is used to control the generation of a start alarm for notifying the driver of a start of the frontal vehicle when the frontal vehicle lying ahead of the subject vehicle starts to run after a traffic signal has turned from red to green at a crossing or after a traffic jam has been alleviated. Thus, the optical radar apparatus 11a always measures the distance to an obstacle in front of the vehicle and the obtained result is reflected on the frontal monitoring control of the vehicle.

Similarly, the optical radar apparatus 11b and 11c serve to monitor the frontal right and left of the own vehicle 12, respectively and are used, for example, to control either the generation of an alarm by detecting a vehicle approaching from the right or left when entering a narrow crossing or the generation of an alarm for preventing an accident in which a pedestrian, a bicycle, a motorcycle or the like is cut off by the vehicle turning right or left.

In addition, the optical radar apparatus 11d and 11e serve to monitor the rear right and left of the own vehicle 12, respectively and are used, for example, to control either the generation of a lane change alarm for notifying a driver of an approaching vehicle from the back when changing the lane or the generation of an entangling alarm at the time of turning right or left.

Furthermore, the optical radar apparatus I If serves to monitor the back of the vehicle and is used to control the generation of an alarm when detecting an approaching wall, an obstacle or the like when the subject vehicle 12 retreats or the generation of a collision alarm for notifying the driver of a following vehicle approaching thereto when the subject vehicle 12 is braked.

The vehicle environment monitoring system is generally constructed as above and a large number of optical radar apparatuses have been required for monitoring the entire environment of the subject vehicle.

Such being the case, in order to solve the above-mentioned various problems, an optical radar apparatus was proposed that can monitor the entire directions or environments surrounding the subject vehicle even with the use of a single one thereof. The relevant optical radar apparatus successively irradiates a beam of light to the surroundings while revolving around its own axis, thereby enabling the monitoring of the vehicle environment in all directions.

However, it is still difficult to completely eliminate the dead angle with the single use of this type of optical radar apparatus. That is, there arises a problem that a beam of light emitted from the optical radar apparatus is intercepted by the subject vehicle depending on the place of installation thereof.

In addition, though the shape or configuration of an obstacle and the like can be detected on the basis of the angle of irradiation of light and the distance to the obstacle, it is still impossible to identify what the obstacle is.

Moreover, depending on the shape or configuration of an obstacle or the weather, the detectivity for the obstacle becomes worse and there are cases where no alarm is issued in spite of an obstacle detected.

Furthermore, this type of optical radar apparatus is generally disposed outside a vehicle and therefore there is a fear of being easily smeared or damaged.

SUMMARY OF THE INVENTION

For solving the above problems, it is an object of the present invention to provide a highly reliable vehicle environment monitoring system effectively utilizing an optical radar apparatus which is capable of monitoring surroundings of a vehicle in all directions.

According to one aspect of the invention, there is provided a vehicle environment monitoring system comprising: an optical radar apparatus installed on a subject vehicle and including light transmission means for generating and irradiating a beam of light, scanner means for scanning the light beam in the surroundings of the subject vehicle, and light receiving means for receiving the light beam irradiated from the light transmission means and reflected from an object; distance calculation means for calculating the distance to the obstacle on the basis of the time elapsed from the light sending time to the light received time; scanning direction detection means for detecting the scanning direction of the optical radar apparatus; and monitoring means for monitoring the surroundings of the subject vehicle on the basis of the outputs from the distance calculation means and the scanning direction detection means to thereby control an alarm means on the basis of the calculated distance. With this arrangement, the surroundings of the subject vehicle can be monitored over a wide range.

In a preferred form of the invention, the optical radar apparatus is disposed on the ceiling inside the subject vehicle. Thus, the staining of the optical radar apparatus is prevented from being stained or damaged by external foreign matter.

In another preferred form of the invention, the optical radar apparatus is disposed on the ceiling of the front passenger's seat side of the subject vehicle. Thus, a dead angle on the side of the front passenger's seat, where driver's sight or attention hardly reaches, can be reduced.

In a further preferred form of the invention, the optical radar apparatus is disposed on the floor of the subject vehicle. Thus, the under-floor region as well as the surroundings of the subject vehicle can be monitored over a wide range.

In a further preferred form of the invention, the optical radar apparatus is disposed at a corner of the subject vehicle. Thus, an obstacle approaching the corner, i.e., a vehicle portion with a relatively high probability of collision, can be reliably detected.

In a further preferred form of the invention, the corner of the subject vehicle is situated on the in the subject vehicle. Thus, a dead angle on the front passenger's seat side can be reduced.

In a further preferred form of the invention, the optical radar apparatus is disposed on a bumper of the subject vehicle. Thus, an obstacle approaching the bumper having a relatively high probability of collision can be reliably detected.

In a further preferred form of the invention, the optical radar apparatus is disposed on a floor of the subject vehicle. Thus, even an obstacle lying in a low place such an under-floor portion can be reliably detected.

In a further preferred form of the invention, the optical axis of the beam of light irradiated from the optical radar apparatus is directed upward or downward relative to the position of installation thereof. Thus, a dead angle for the optical radar apparatus can be reduced.

In a further preferred form of the invention, the optical axis of the beam of light irradiated from the optical radar apparatus is oscillated vertically. Thus, a dead angle for the optical radar apparatus can also be reduced.

In a further preferred form of the invention, the scanner means comprises: a reflective member pivotally supported on a support shaft in an inclined manner for reflecting the beam of light from the light transmission means: drive means for driving the support shaft together with the reflective member to rotate; a tubular guide member disposed near the reflective member with the support shaft arranged therein, the tubular member having one end in a corrugated configuration with which the reflective member is in butting engagement; and biasing means disposed between the reflective member and the tubular guide member for biasing the reflective member toward the corrugated end of the tubular guide member. With this arrangement, in a simple construction, a beam of light irradiated from the optical radar apparatus can be shed to the surroundings of the subject vehicle in all directions in a substantially uniform manner, thus greatly reducing a dead angle for the optical radar apparatus.

In a further preferred form of the invention, a plurality of optical radar apparatuses are provided. Thus, an obstacle can be surely detected by using the plurality of optical radar apparatuses.

In a further preferred form of the invention, at least two of the plurality of optical radar apparatuses are disposed at diagonally opposite corners, respectively, of the subject vehicle. Thus, the entire surroundings of the subject vehicle can be monitored with a relatively small number of optical radar apparatuses.

In a further preferred form of the invention, the plurality of optical radar apparatuses are individually installed at different heights. Thus, interference of beams of light irradiated from the respective optical radar apparatuses can be avoided.

In a further preferred form of the invention, the monitoring means comprises object identification means for detecting the configuration of the object on the basis of the distance information and the direction information obtained by the optical radar apparatus to thereby identify the object through comparison of the detected configuration with a predetermined configuration. Thus, by detecting the configuration of the object on the basis of the distance information and direction information and comparing the detected configuration with the predetermined configuration as well, the object can be identified in a reliable manner.

In a further preferred form of the invention, the monitoring means further comprises: relative-speed calculation means for calculating a relative speed between the obstacle and the subject vehicle on the basis of a difference between a previous position and a current position of the object detected by the object identification means; and alarm control means for controlling the alarm means on the basis of the thus calculated relative speed. Thus, by calculating the relative velocity between the object and the subject vehicle, the alarm means can be controlled in accordance with the calculated relative velocity.

In a further preferred form of the invention, the alarm control means comprises: alarm area setting means for setting, on the basis of the relative speed, an alarm area in which an alarm should be issued; and alarm area intrusion judgment means for judging whether an object is present within the alarm area and for driving the alarm means if it is judged that an object is present within the alarm area. Thus, since the area where an alarm should be issued is set in accordance with the relative velocity, the safety in driving is improved.

In a further preferred form of the invention, the alarm control means comprises: alarm timing setting means for setting a predetermined first time on the basis of the relative speed in such a manner as to drive the alarm means the predetermined first time before an object intrudes into the alarm area; and alarm timing judgment means for calculating a second time taken until an object intrudes the alarm area on the basis of the relative speed and the position of the object, and for driving the alarm means if the second time is less than the predetermined first time. With this arrangement, since the alarm timing is set in accordance with the relative velocity, the safety in driving is increased.

In a further preferred form of the invention, the monitoring means further comprises: vector calculation means for calculating, on the basis of the difference between the previous and current positions of the object detected by the object identification means, a vector (distance and direction) of the object in the alarm area relative to the subject vehicle; and alarm control means for controlling the alarm means on the basis of the thus calculated vector. Thus, the alarm means can be controlled in accordance with the vector of the object relative to the subject vehicle.

In a further preferred form of the invention, the alarm control means comprises separation judgment means for judging the relative moving direction of the object relative to the subject vehicle and inhibiting the driving of the alarm means if it is judged that the relative moving direction of the object relative to the subject vehicle is a direction away from the subject vehicle. Thus, a useless alarm operation can be avoided because the driving of the alarm means is inhibited when it is judged on the basis of the vector that the relative moving direction of the object relative to the subject vehicle is a direction away from the subject vehicle.

In a further preferred form of the invention, the monitoring means comprises object identification means for identifying the object on the basis of distance information and direction information obtained by the plurality of optical radar apparatuses. Thus, the object can be surely identified on the basis of information obtained by the plurality of optical radar apparatuses.

In a further preferred form of the invention, the plurality of optical radar apparatuses are individually installed at different heights on the ceiling or the floor of the subject vehicle. Thus, interference of beams of light irradiated from the respective optical radar apparatuses can be avoided.

In a further preferred form of the invention, the scanner means controls a scanning amount of the light beam from the light transmission means on the basis of the output from the scanning direction detection means.

In a further preferred form of the invention, the scanner means diminishes the scanning amount for the front-to-rear direction of the subject vehicle in comparison with that for the right-to-left direction of the subject vehicle. Thus, the scanning amount can be restricted depending on the scanning direction of the optical radar apparatus.

In a further preferred form of the invention, the vehicle environment monitoring system further comprises load detection means for detecting the application of a predetermined load and generating a corresponding output, the scanner means controlling the scanning amount in accordance with the output of the scanning direction detection means if the predetermined load is applied.

In a further preferred form of the invention, the vehicle environment monitoring system further comprises speed detection means for detecting a speed of the subject vehicle and generating a corresponding output, the scanner means controlling a scanning amount of the light beam from the light transmission means in accordance with the output of the speed detection means. Thus, the speed of the subject vehicle is detected and the scanning amount of the optical radar apparatus can be controlled in accordance with the detected vehicle speed.

In a further preferred form of the invention, the scanner means augments the scanning amount in comparison with that for a speed less than a predetermined value if the speed detection means detects a vehicle speed greater than the predetermined value. Thus, the safety during high-speed driving can be increased.

According to another aspect of the invention, there is provided a vehicle environment monitoring system comprising: an optical radar apparatus installed on a subject vehicle and including light transmission means for generating and irradiating a beam of light, scanner means for scanning the light beam in the surroundings of the subject vehicle, and light receiving means for receiving the light beam irradiated from the light transmission means and reflected from an object; situation judgment means for judging whether the optical radar apparatus is in a used state or an unused state; and protective means adapted to be controlled by the situation judgment means for protecting the optical radar apparatus if it is judged that the optical radar apparatus is in the unused state. Thus, the optical radar apparatus can be protected from being stained or damaged.

In a further preferred form of the invention, the protective means comprises a shutter for covering the optical radar apparatus. Thus, the optical radar apparatus, can be protected by the shutter from being stained or damaged.

In a further preferred form of the invention, the protective means comprises: a housing for receiving the optical radar apparatus; and transport means for transporting the optical radar apparatus into and out of the housing. With this arrangement, the optical radar apparatus can be protected from being stained or damaged because of being stored during non-use.

In a further preferred form of the invention, the vehicle environment monitoring system further comprises cleaner means which is operated in synchronization with the operation of the protective means for cleaning the optical radar apparatus. Thus, synchronously with the operation of the protective means, the cleaner means cleans the optical radar apparatus, thereby preventing the deterioration of performance thereof.

The above and other objects, features and advantages of the present invention will be readily apparent from the ensuing detailed description of preferred embodiments of the invention when taken in conjunction with the accompanying drawings.

BRIEF DESCRIPTION OF THE DRAWINGS

FIG. 41 is a block diagram of Embodiment 19 of the

DESCRIPTION OF THE PREFERRED EMBODIMENTS

Preferred embodiments of the present invention will now be described in detail while referring to the accompanying drawings.

Embodiment 1

Figure 1:
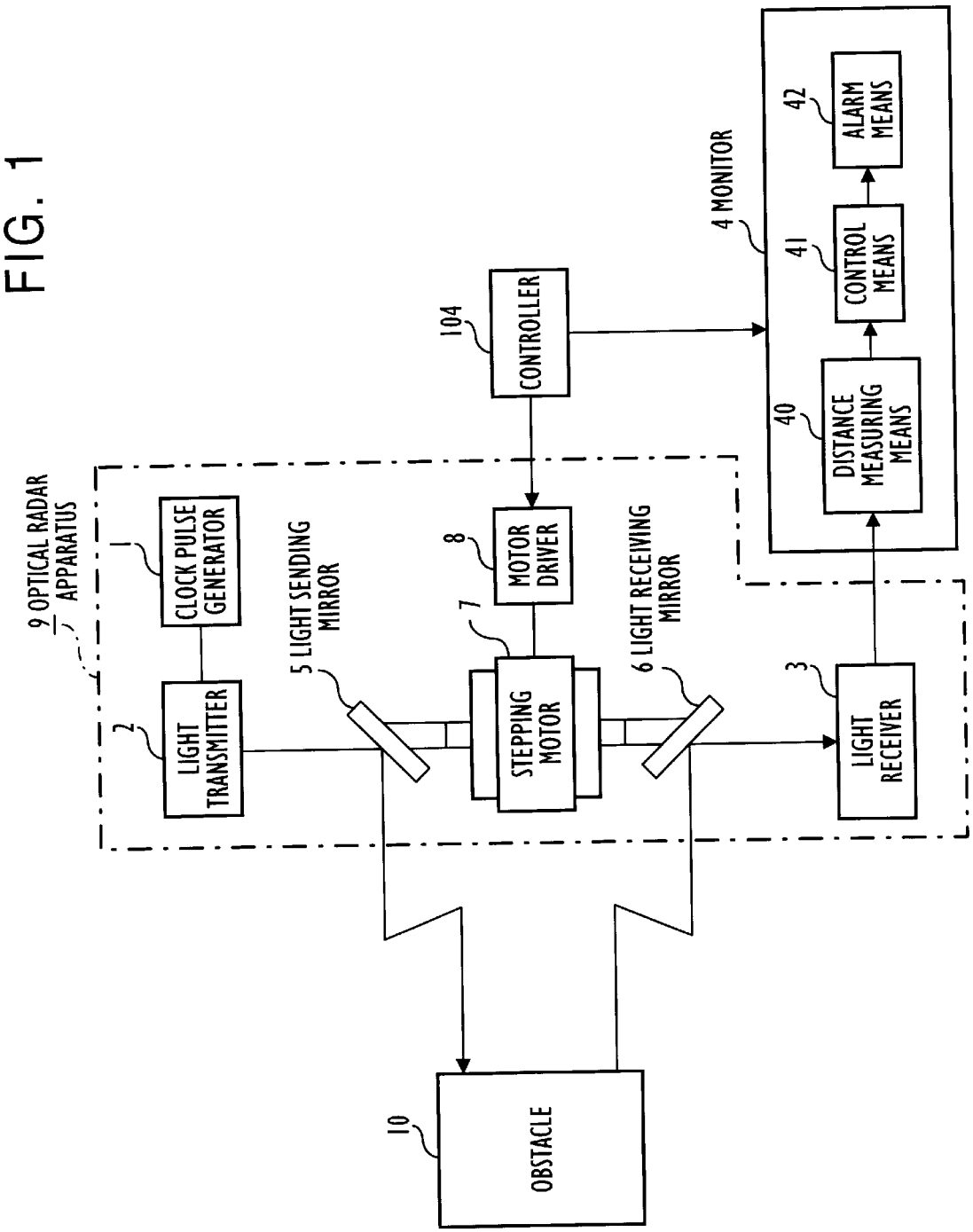
FIG. 1 is a block diagram of an optical radar apparatus according to the present invention.

FIG. 1 shows in a block diagram a vehicle environment monitoring system constructed in accordance with a first embodiment of the present invention. This vehicle environment monitoring system comprises an optical radar apparatus, generally designated at reference numeral 9, for detecting an object or obstacle present in the environment or surroundings of a vehicle on which the system is installed, the vehicle being hereinafter referred to as the subject vehicle, and a monitor 4 for calculating the distance between the optical radar apparatus 9 and the obstacle, monitoring the environment or surroundings of the subject vehicle on the basis of the calculated distance and performing alarm control on the basis of the monitored result. The optical radar apparatus 9, which is disposed at a location suitable for detecting or searching objects in all directions from the subject vehicle, comprises a clock pulse generator 1, a light transmitter 2 for sending a beam of light toward an object or obstacle 10 in synchronization with a clock pulse generated by the clock pulse generator 1, a light receiver 3 for receiving the beam of light reflected from an object or obstacle 10 and photoelectrically converting it into a corresponding electrical signal, a stepping motor 7 for driving the light receiver 3 so as to control an angle of light (light transmission angle) transmitted from the light transmitter 2 and an angle of light (light receiving angle) to be received by the light receiver 3, and a motor driver 8 for driving and controlling the stepping motor 7.

Here, it is to be noted that the stepping motor 7 and the motor driver 8 constitutes a scanning direction detection means as claimed of the present invention. Furthermore, the monitor 4 comprises a distance measuring means 40 for calculating or measuring the distance between the optical radar apparatus 9 and an obstacle 10 in accordance with the time elapsed from the light sending time at which a beam of light is transmitted from the light transmitter 2 to the received-light detecting time at which the light beam reflected from the obstacle 10 is received by the light receiver 3, an alarm means 42 for generating an alarm sound, and a control means 41 for controlling the operation of the alarm means 42 in accordance with the calculated or measured distance.

Figure 37:
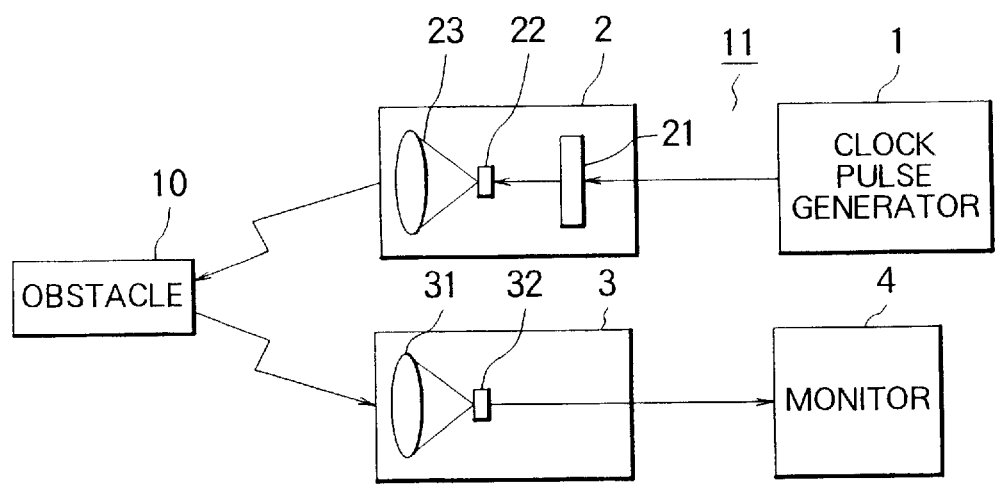
FIG. 37 is a block diagram of a conventional optical radar apparatus.
Figure 38:
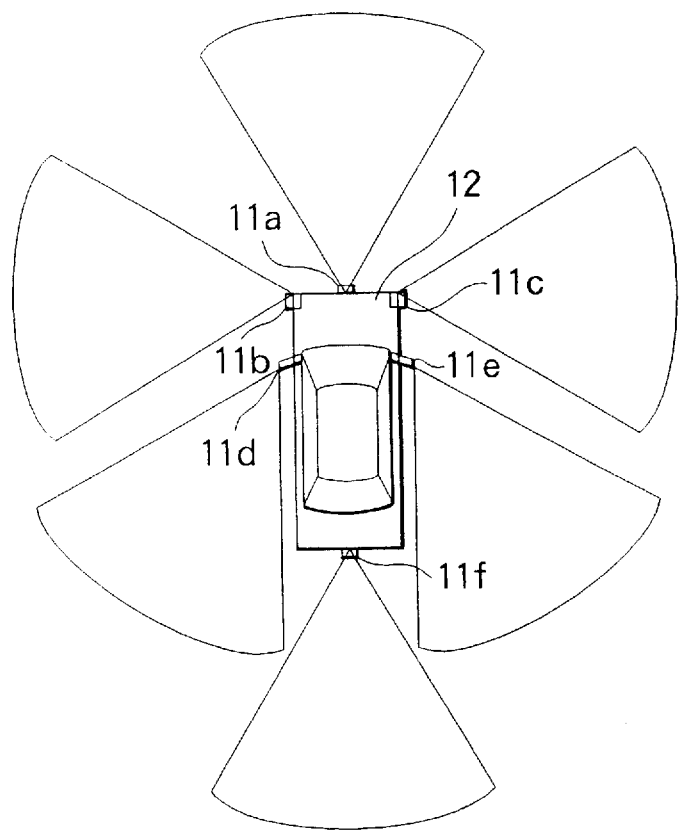
FIG. 38 is an explanatory view of a conventional vehicle environment monitoring system.

Receiving a signal in the form of a clock pulse from the clock pulse generator 1, the light transmitter 2 generates and irradiates a beam of light by driving a laser diode (not shown), while the light receiver 3 receives and photoelectrically converts a beam of light sent by the light transmitter 2 and reflected from an obstacle 10 into a corresponding electric signal. On the basis of the propagation delay time elapsed from the light sending time of the light transmitter 2 to the received-light detecting time of the light receiver 3, the distance measuring means 40 constituting a monitor 4 calculates the distance between the optical radar apparatus 9 and the obstacle 10. The calculated result is outputted to the control means 41. As a result, the control means 41 actuates the alarm means 42 to generate an alarm sound. A beam of light from the light transmitter 2 is reflected by the light sending mirror 5 to irradiate the surroundings of the vehicle. On the other hand, the beam of light reflected from the obstacle 10 is received by the light receiving mirror 6 and reflected in the direction toward the light receiver 3. The light sending mirror 5 and the light receiving mirror 6 are fixed to the driving shaft of the stepping motor 7 and adjusted to form an angle of 45° with respect to the optical axis of the light transmitter 2 and an angle of 45° with respect to the optical axis of the reflected light, respectively. The stepping motor 7 is driven and controlled by the motor driver 8, whose driving is based on information or an instruction from a sensor (not shown), a computer or the like (controller 104). Incidentally, in FIG. 1, like symbols are attached to portions similar or corresponding to those of FIG. 37.

The optical radar apparatus 9 constructed in this manner generates a beam of light from the light transmitter 2 toward the light sending mirror 5 which irradiates it to an obstacle 10. The beam of light reflected from the obstacle 10 is further reflected by the light receiving mirror 6 to the light receiver 3, while the distance measuring means 4 calculates the distance to the obstacle 10 on the basis of the propagation delay time of light in the form of a time span between the light sending time and the light receiving time. After the distance measurement by the distance measuring means 4 is completed, the motor driver 8 drives or energizes the stepping motor 7 to rotate by a predetermined angle, e.g., 2°, as a scanning angle or amount. Then, the distance measuring means 4 calculates the distance again in response to a signal from controller 104. The optical radar apparatus 9 repeats these operations, thereby enabling obstacles in all directions to be detected. The light sending mirror 5, the light receiving mirror 6 and the stepping motor 7 function as a scanner means for scanning a beam of light irradiated by the optical radar apparatus 9. The motor driver 8 incorporates therein a scanning-direction detection means which detects the direction of the beam of light irradiated by the optical radar apparatus 9 by detecting the pattern of a driving signal of a stepping motor 7. The technique of detecting the position of the driving shaft of a stepping motor from the pattern of a driving signal for the stepping motor 7 is well known and will not be detailed here. Various other techniques of detecting the position of the driving shaft of a motor have so far been proposed and it is natural that any of them may be employed.

Figure 2:
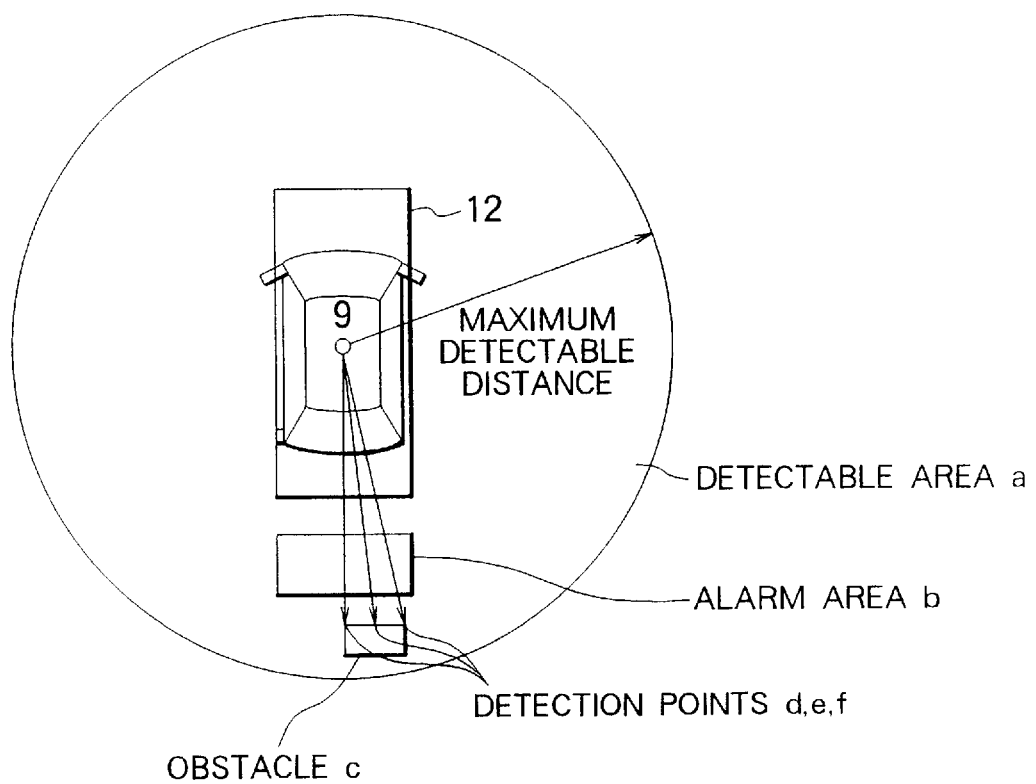
FIG. 2 is an explanatory view showing a vehicle environment monitoring system according to a first embodiment (Embodiment 1) of the present invention.

In this embodiment, the optical radar apparatus 9 described above is disposed on the ceiling inside the subject vehicle 12 as shown in FIG. 2. That is, the feature that the optical radar apparatus 9 can detect objects or obstacles in all directions is not injured by disposing the apparatus 9 on the interior ceiling of the vehicle, and external physical damage to the apparatus 9, heating thereof by direct sunshine, stain thereon by weathering, degradation of the outer appearance of the vehicle can be prevented by disposing the apparatus 9 inside the vehicle.

One example of controlling the vehicle environment monitoring system constructed in the above manner will be described by referring to FIG. 2. A detectable area a, in which the detection of obstacles is possible, depends chiefly on an output power (e.g., light intensity) of the optical radar apparatus 9. Since the optical radar apparatus 9 is able to detect objects or obstacles present in all directions, the detectable area a becomes a circle as shown in FIG. 2. Symbol b denotes an alarm area which is previously set by the apparatus 9 such that the alarm means 42 generates an alarm if there exists an obstacle within the alarm area b at the time when the subject vehicle 12 retrocedes.

The vehicle environment monitoring system successively monitors surroundings of the subject vehicle in all directions, i.e., through an angular range of 360° around the subject vehicle. At this time, the vehicle environment monitoring system detects the distance and direction of an obstacle c at the detected points d, e and f but generates no alarm because the detected points d, e and f are situated outside the alarm area b. If it is determined that the subject vehicle 12 further retrocede and an obstacle c intrudes in the alarm area b, the vehicle environment monitoring system generates an alarm and calls driver's attention.

Incidentally, in setting the alarm area b, the size thereof may be changed or the setting position thereof may be shifted in the right or left direction depending on the receding speed of the subject vehicle and/or the steering amount or angle of the steering wheel of the vehicle.

Embodiment 2

Figure 3:
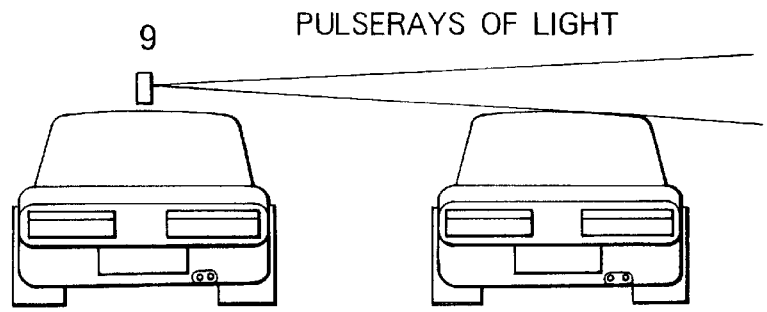
FIG. 3 is an explanatory view showing an operating state of Embodiment 1.

The optical radar apparatus 9 to be used in the present invention can monitor in all directions but is considered in some cases not to properly function as a vehicle environment monitoring system. For example, as shown in FIG. 3, there is a case where, though the optical radar apparatus 9 is disposed on the ceiling of the subject vehicle, the height of other vehicles running near the subject vehicle is lower than that of the subject vehicle and accordingly no irradiated beam of light hits against any other vehicle. This becomes a problem especially when the subject vehicle is a large-sized vehicle such as a truck.

Figure 4:
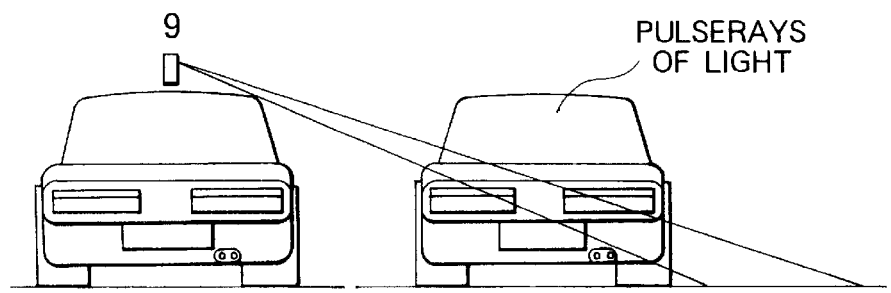
FIG. 4 is an explanatory view showing an operation of Embodiment 2 of the present invention.

For solving this problem, it is only necessary to widen the irradiation angle of light transmitted from the optical radar apparatus 9, i.e., to enlarge the size of the light beam. However, enlarging the size of the light beam with the same light intensity, the maximum detection distance decreases and accordingly the output power of the optical radar apparatus 9 has to be increased in order to attain the same maximum detection distance as that with the not enlarged light beam, thus resulting in the scaling up of the apparatus and hence an increase in the cost of manufacture. Thus, in the second embodiment, this problem is solved by directing the optical axis of the optical radar apparatus downward as shown in FIG. 4. This can be simply achieved, for example, by changing the angle of the light sending mirror 5. A change in the angle of the light sending mirror 5 can reduce the dead angle of the optical radar apparatus 9 so that the surroundings of the subject vehicle can be monitored by using a single optical radar apparatus.

Although the optical radar apparatus 9 is disposed on the ceiling outside the vehicle as shown in FIG. 4, it may be disposed on the ceiling inside the vehicle.

Embodiment 3

In the embodiments mentioned above, increasing the maximum detection distance without any substantial increase in the size of the irradiating light beam has been described. Particularly, In the second embodiment, a large obstacle such as a wall or another vehicle can be sufficiently detected but a relatively small obstacle might not be illuminated with light transmitted from the optical radar apparatus 9 so it could not be detected even if an obstacle lies within the detectable area. A third embodiment is available for the purpose of solving this problem and provides a vehicle environment monitoring system having a great maximum detection distance without accompanying a scaling up of the system and having an extremely small dead angle as well.

Figure 5:
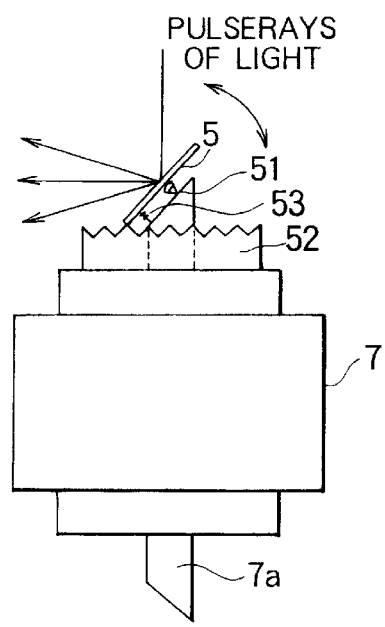
FIG. 5 is a schematic side view of essential portions of a light radar apparatus according to Embodiment 3 of the present invention.

FIG. 5 shows a block diagram of this embodiment in which beams of light irradiated from the optical radar apparatus 9 are arranged to scan not only in the horizontal direction but also in the vertical direction while being oscillated up and down.

Figure 6:
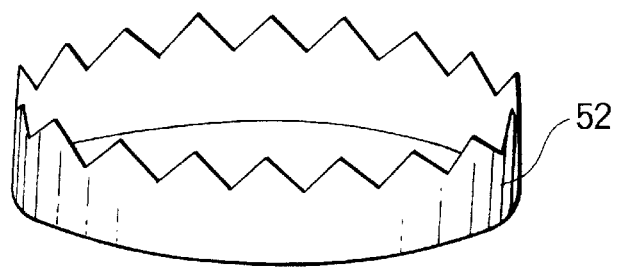
FIG. 6 is a perspective view of a cylindrical cam of the optical radar apparatus of FIG. 5.

The light sending mirror 5 in the form of a reflective member is pivotally supported on a tapered end of a support shaft in the form of a driving shaft 7a of the stepping motor 7 through a universal joint 51 which is disposed on the optical-axis center of the light sending mirror 5. A tubular guide member in the form of a hollow cylindrical cam 52 is fixedly secured at its one end to the body or frame of the stepping motor 7 in a manner such that the driving shaft 7a of the stepping motor 7 extends through the center of the cylindrical cam 52 in axial alignment therewith and is rotatable relative thereto. A biasing means in the form of a tension spring 53 is disposed between the light sending mirror 5 and the tapered end of the driving shaft 7a for resiliently biasing a peripheral edge of the mirror 5 into abutting engagement with the other end of the cylindrical cam 52 which is configured into a corrugated or saw-teethed shape, as schematically illustrated in FIG. 6. The light sending mirror 5 is horizontally driven to rotate with the rotation of the stepping motor 7 while being oscillated vertically along the corrugated or undulated end edge of the cylindrical cam 52.

The optical radar device 9 arranged in this way drives the light sending mirror 5 horizontally in a circular manner with the rotation of the stepping motor 7 and oscillates it vertically along the corrugated end of the cylindrical cam 52.

Figure 7:
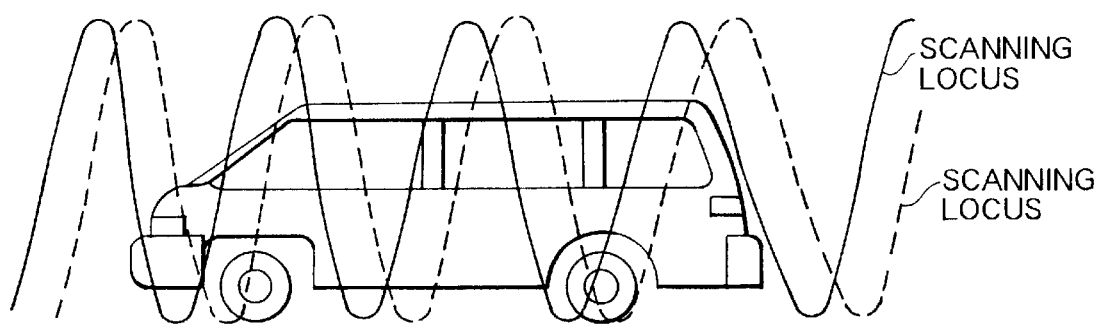
FIG. 7 is an explanatory view of scanning trajectories of an optical radar apparatus according to Embodiments 3, 4 of the present invention.
Figure 8:
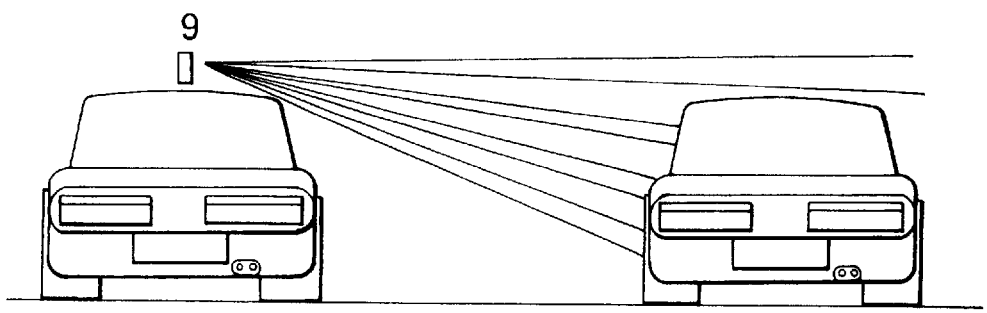
FIG. 8 is an explanatory view, seen from another direction, of scanning trajectories of the optical radar apparatus according to Embodiment 3 of the present invention.

FIG. 7 shows a scanning trajectory of the beam of light irradiated from the optical radar apparatus 9 according to this embodiment. In FIG. 7, the solid line denotes a scanning trajectory of the third embodiment. Also, FIG. 8 shows a scanning trajectory of the third embodiment as viewed from another angle. FIG. 7 reveals that the dead angle of the optical radar apparatus 9 extremely decreases in comparison with that of FIG. 3 embodiment. In addition, a beam of light generated by the optical radar apparatus 9 is irradiated on various portions, such as tires, body and windows, of a vehicle running near the subject vehicle and consequently has the advantage that a target vehicle can be detected in a reliable manner even if the color, shape, height or like feature thereof is hardly detected.

Furthermore, for a still smaller dead angle, it is only necessary to shift a scanning trajectory after each one turn of the optical radar apparatus 9. That is, as illustrated in FIG. 7, the solid line is assumed to represent a first-turn scanning trajectory, then the second-turn trajectory is recommended to be slightly shifted as represented by the broken line.

To implement this, in contrast to the cylindrical cam 52 fixed on the stepping motor 7 for the above third embodiment, it is advisable to support the cylindrical cam 52 in a manner to rotate around the driving shaft 7a of the stepping motor 7, whereby the position of the cylindrical cam 52 can be rotated little by little by a driving means (not shown) for each one turn of the stepping motor 7.

Embodiment 4

Figure 9:
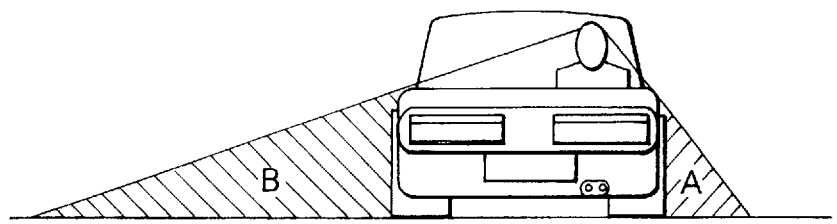
FIG. 9 is an explanatory view showing the dead angle of a driver.

FIG. 9 shows a dead angle of the driver, as viewed from the back of the subject vehicle. In FIG. 9, the hatched portion is a region forming the dead angle of the driver. From this illustration, it is found that a dead angle B of the front passenger' side is larger than a dead angle A of the driver' side.

Figure 10:
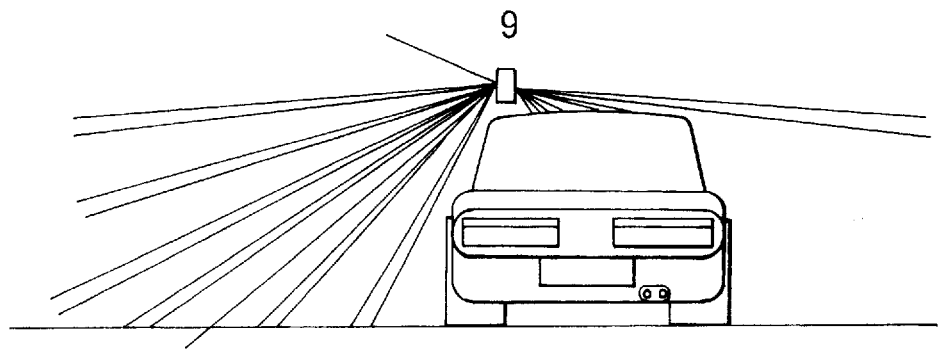
FIG. 10 is an explanatory view of Embodiment 4 of the present invention.

In a fourth embodiment, to effectively reduce the dead angle of the front passenger' side, an optical radar apparatus 9 is disposed on the ceiling of the front passenger's seat side as shown in FIG. 10. In this arrangement, the dead angle region of the driver is compensated for by the vehicle environment monitoring system, thereby improving safety in driving.

Here, it should be noted that using the arrangement according to the third embodiment together with this arrangement is more effective.

In addition, if the optical radar apparatus 9 is disposed especially at the front: portion of the ceiling on the front passenger's seat side, it is particularly effective for a vehicle such as a truck in which the forward safety confirmation is difficult.

Furthermore, if the optical radar apparatus 9 is disposed especially at the rear portion of the ceiling on the front passenger's seat side, it is particularly effective for a vehicle in which the backward safety confirmation is more difficult than the forward one.

Embodiment 5

According to the fourth embodiment mentioned above, the surroundings of the subject vehicle 12 can be monitored over a wide range. Nevertheless, if there is any obstacle under the floor of the subject vehicle, such an obstacle cannot be detected. That is, e.g., when an animal or a child creeps under the floor of the subject vehicle, this object cannot be detected.

Figure 11:
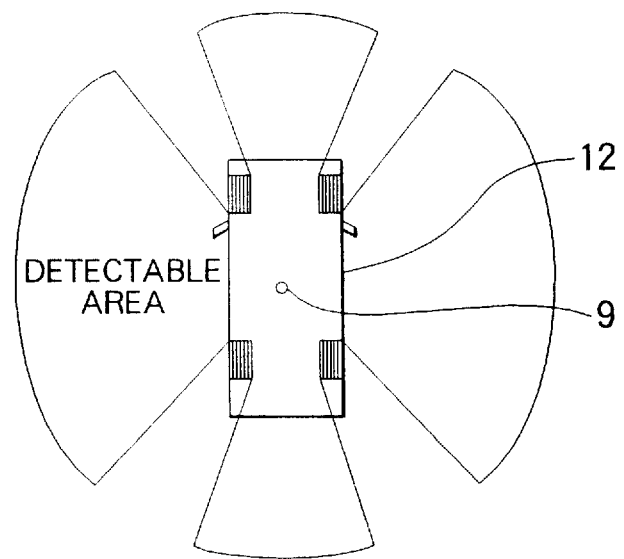
FIG. 11 is an explanatory view of Embodiment 5 of the present invention.

1 fifth embodiment is for the purpose of solving this problem and the arrangement thereof is shown in FIG. 11. In FIG. 11, an optical radar apparatus 9 is disposed at the center of the floor of the subject vehicle 12 and a sector-shaped area shows a detectable area for the vehicle environment monitoring system arranged in this way.

According to this embodiment, nearly all directions in the surroundings of the subject vehicle can be monitored but an animal or a child creeping under the floor of the subject vehicle 12 can also be detected in a reliable manner.

In the meantime, in the above arrangement in which the optical radar apparatus 9 is disposed at a low position, a beam of light from the optical radar apparatus 9 does not hit against such an object as another vehicle, located at a higher position than that of the subject vehicle, and consequently there is a fear of not being detected.

Thus, in the above arrangement, it is to be desired to direct the optical axis of irradiating light of the optical radar apparatus 9 upward. A concrete method for implementing this would best follow the second or third embodiment.

Figure 12:
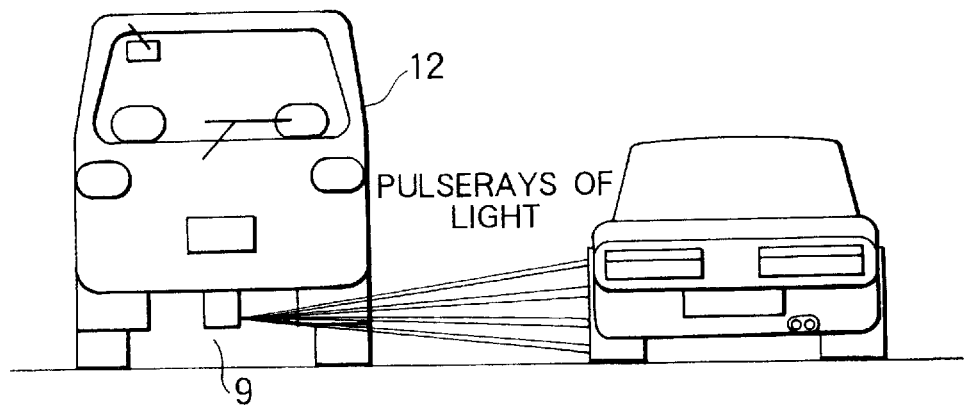
FIG. 12 is an explanatory view illustrating the case in which Embodiment 2 or Embodiment 3 is applied to Embodiment 5 of the present invention.

FIG. 12 shows an arrangement resulting from application of Embodiment 2 or Embodiment 3 to Embodiment 5.

Figure 13:
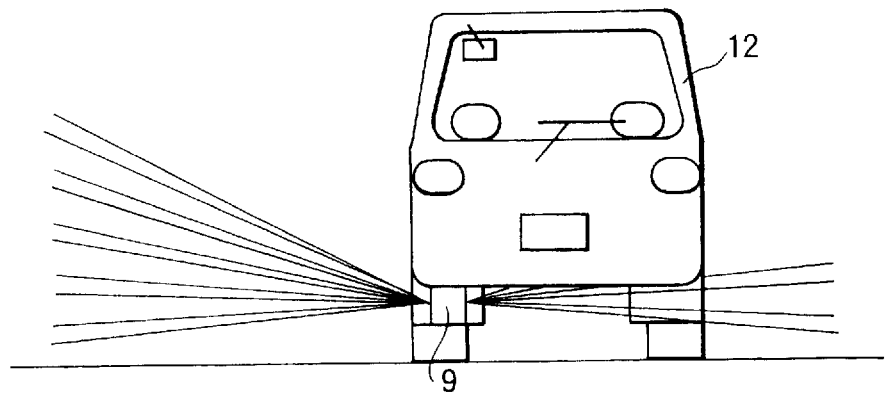
FIG. 13 is an explanatory view illustrating the case in which Embodiment 3 or Embodiment 4 is applied to Embodiment 5 of the present invention.

Furthermore, FIG. 13 shows an arrangement resulting from application of the fourth embodiment to the fifth embodiment. According to this arrangement, by using a single optical radar apparatus, the under-floor portions of the vehicle and all directions in the surroundings thereof can be monitored but the dead angle of the front passenger's side can be also eliminated. As mentioned above, disposing an optical radar apparatus 9 according to this embodiment on the front of the vehicle facilitates the forward safety confirmation in a large-sized vehicle, whereas disposing it on the rear facilitates the backward safety confirmation in a small-sized vehicle.

Embodiment 6

Figure 14:
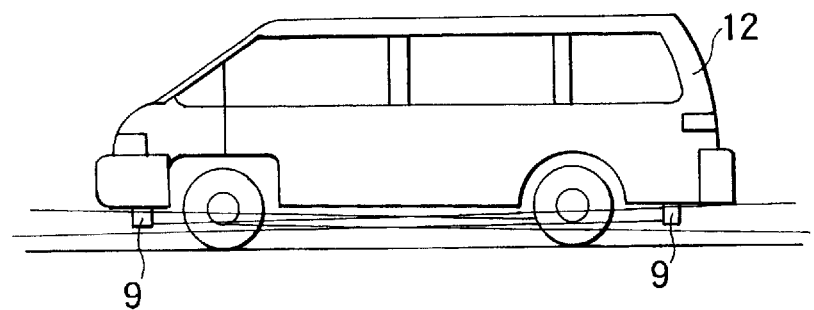
FIG. 14 is an explanatory view of Embodiment 6 of the present invention.

FIG. 14 is a block diagram showing a sixth embodiment, in which a plurality of optical radar apparatuses 9 are disposed one for each of the front floor and the rear floor of the subject vehicle.

According to this embodiment, the dead angle attributable to tires as shown in FIG. 11 can be greatly reduced and nearly all directions in the surroundings of the subject vehicle can be monitored.

In addition, since a beam of light irradiated from an optical radar apparatus widens increasingly according as it goes far and far, a child or the like under the floor of the subject vehicle can be reliably detected.

Embodiment 7

A seventh embodiment provides a vehicle environment monitoring system which is able to not only monitor the under-floor portions of the subject vehicle and all directions in the surroundings thereof but also detect another vehicle in a reliable manner irrespective of the color, shape, height or other attributes thereof.

Figure 15:
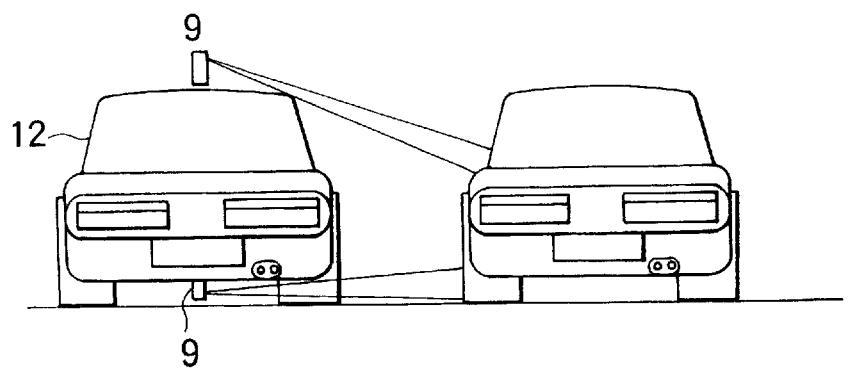
FIG. 15 is an explanatory view of Embodiment 7 of the present invention.

FIG. 15 shows an arrangement of the seventh embodiment using two optical radar apparatuses 9, one being disposed on the ceiling of the subject vehicle and the other on the floor thereof.

With a vehicle environment monitoring system arranged in this manner, even if it is difficult to detect another vehicle depending on its color, shape, height or other attributes with a single optical radar apparatus, it is possible to detect such a vehicle in a reliable manner by the use of two or more optical radar apparatuses. In addition, an obstacle at a high position can be reliably detected by an optical radar apparatus disposed on the ceiling, whereas an obstacle at a low position can be reliably detected by an optical radar apparatuses disposed at the floor.

Furthermore, the seventh embodiment is preferable from the standpoint of fail-safe operation because even if either one of the two optical radar apparatuses fails, it is still possible to monitor the surroundings of the subject vehicle by using the other normally operating optical radar apparatus.

Embodiment 8

Figure 16:
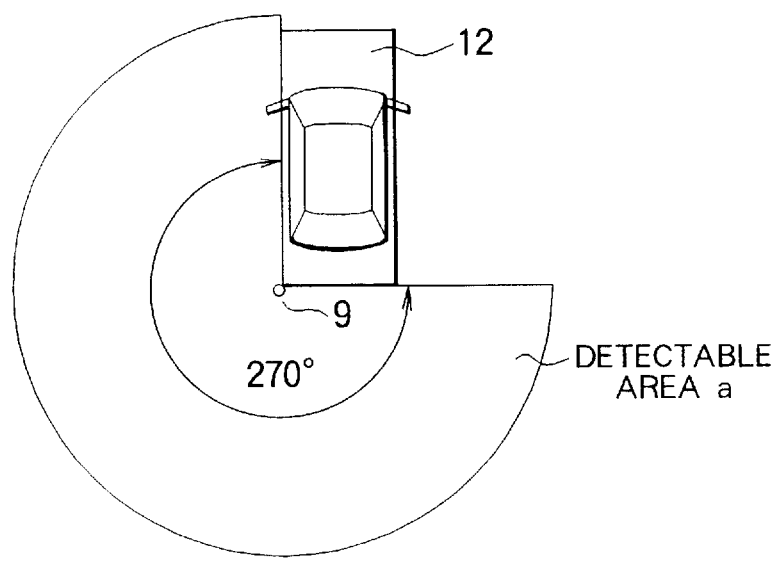
FIG. 16 is an explanatory view of Embodiment 8 of the present invention.

FIG. 16 shows a case where an optical radar apparatus 9 is disposed at a corner in the rear portion of the front passenger's seat of the subject vehicle 12. In this case, since the optical radar apparatus 9 is disposed at a corner of the vehicle in which the probability of contact of the vehicle with other objects is the highest, the contact of the vehicle with obstacles in the surroundings thereof can be reliably prevented.

Figure 17:
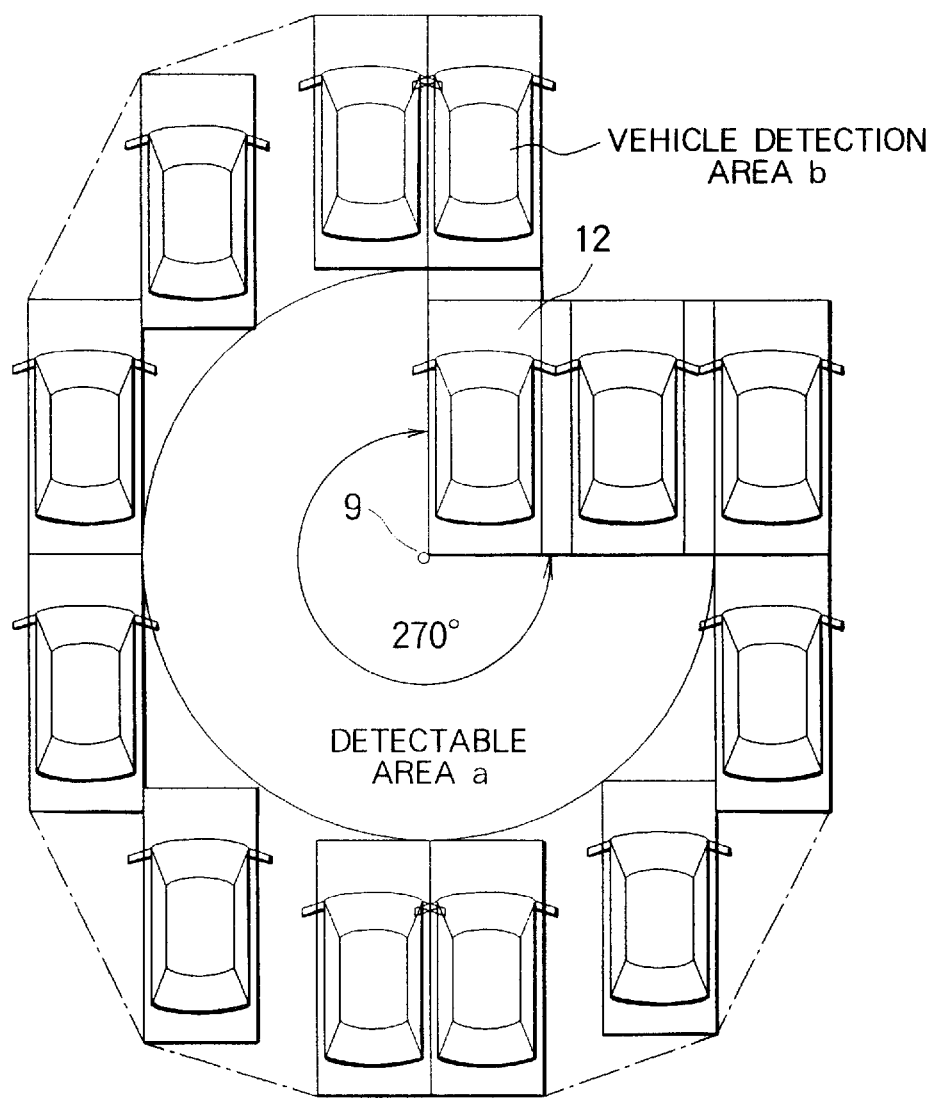
FIG. 17 is an explanatory view showing a vehicle detectable area for Embodiment 8 of the present invention.

Although FIG. 16 describes the detectable area a of an optical radar apparatus 9 in the angular range of 270°, a vehicle running in the vicinity of the subject vehicle 12 can be detected in actuality if only a part of it is present in the detectable area a and therefore a practical detectable area for a vehicle becomes as represented by the area b in FIG. 17.

According to FIG. 17, the front or forward area on the driver's side is situated in the dead angle of the optical radar apparatus 9 but this area is the most perspective one for the driver, thus presenting no problem in practice.

On the basis of monitor information of the optical radar apparatus 9 disposed in this way, the vehicle environment monitoring system constitutes a lane change alarm system for sounding an alarm when the subject vehicle carries out a lane change if there is a subsequent vehicle running in the changed lane. It also constitutes a rear warning alarm system for displaying a preliminary warning or generating a preliminary warning alarm when a wall or obstacle approaches the subject vehicle from the rear.

Figure 18:
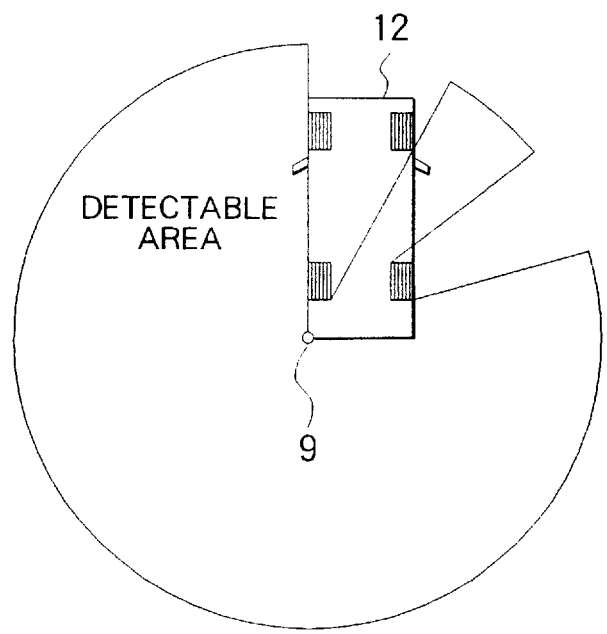
FIG. 18 is an explanatory view of a modification of Embodiment 8 of the present invention.

FIG. 18 shows an arrangement that an optical radar apparatus 9 is installed at a corner, especially on the floor of the subject vehicle 12. According to this arrangement, a wide detectable area is obtained in which an angular range of 270° or more can be continuously monitored.

Thus, a vehicle environment monitoring function principally for nearly all regions in the surroundings of the subject vehicle 12 and for the region under the floor thereof can be implemented inexpensively.

In addition, especially when an optical radar apparatus 9 is installed at a corner of the floor in the rear of the front passenger's seat, the dead angle on the front passenger's seat side can be effectively reduced.

Figure 19:
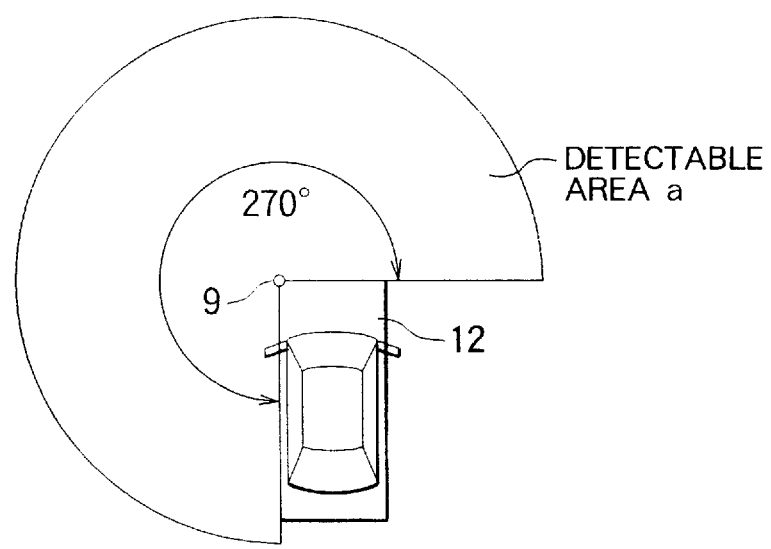
FIG. 19 is an explanatory view of still another modification of Embodiment 8 of the present invention.

FIG. 19 shows an arrangement that an optical radar apparatus 9 is disposed in the front of the front passenger's seat side of the subject vehicle 12.

Also in the arrangement of FIG. 19, a monitor region equivalent to the vehicle detectable area b shown in FIG. 17 is obtained.

According to this arrangement, the dead angle on the front passenger's seat side as well as the entire environment or surroundings in front of the vehicle can be monitored, so there can be provided a system for detecting the cars approaching from the right and the left when the subject vehicle enters a narrow crossing, a cutoff accident prevention alarm system for detecting the presence of a pedestrian, a bicycle, a motor bicycle or the like moving forward in front of which the subject vehicle is about to be cutting off upon tuning right or left, and for generating an alarm, a front vehicle start alarm system for generating an alarm upon start of a vehicle in front of the subject vehicle, and the like.

Furthermore, the arrangement of FIG. 16 or FIG. 19 is inexpensive because various systems as mentioned above can be constructed on the basis of monitor information obtained by a single optical radar apparatus 9.

Figure 20:
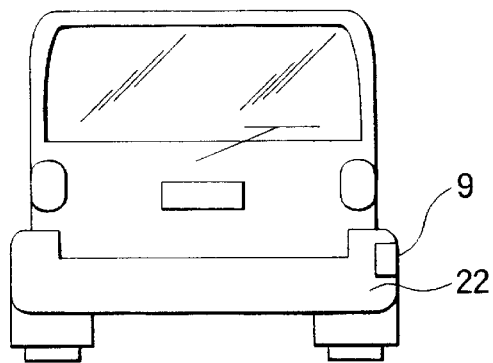
FIG. 20 is an explanatory view of yet another modification of Embodiment 8 of the present invention.

Although in the above embodiments, the optical radar apparatus 9 is disposed at a corner of the subject vehicle 12, it is more effective and advantageous to dispose the apparatus on the bumper of the vehicle as shown in FIG. 20.

That is, the disposition of the optical radar apparatus 9 on the ceiling or floor of the subject vehicle creates a certain degree of dead angle near the subject vehicle since the body of the subject vehicle 12 more or less hinders transmission of the light generated by the apparatus 9.

In contrast to this, in a case where the apparatus is disposed on the bumper, the dead angle near the subject vehicle can be minimized. In addition, even if an obstacle is a low curb or a child, such an obstacle can be surely detected. Furthermore, since the height of a bumper does not so greatly vary with different models of motor vehicles (50–100 cm above the road surface), other vehicles can be reliably detected.

Also, when embedding an optical radar apparatus 9 in the bumper, a further advantage can be obtained.

That is, since the optical radar apparatus 9 is embedded in the bumper, the dead angle can be completely eliminated. In addition, because of embedded installment of the apparatus, the outer appearance of the subject vehicle 12 is not injured and at the same time damage can be prevented by protective action of the bumper.

Embodiment 9

Figure 21:
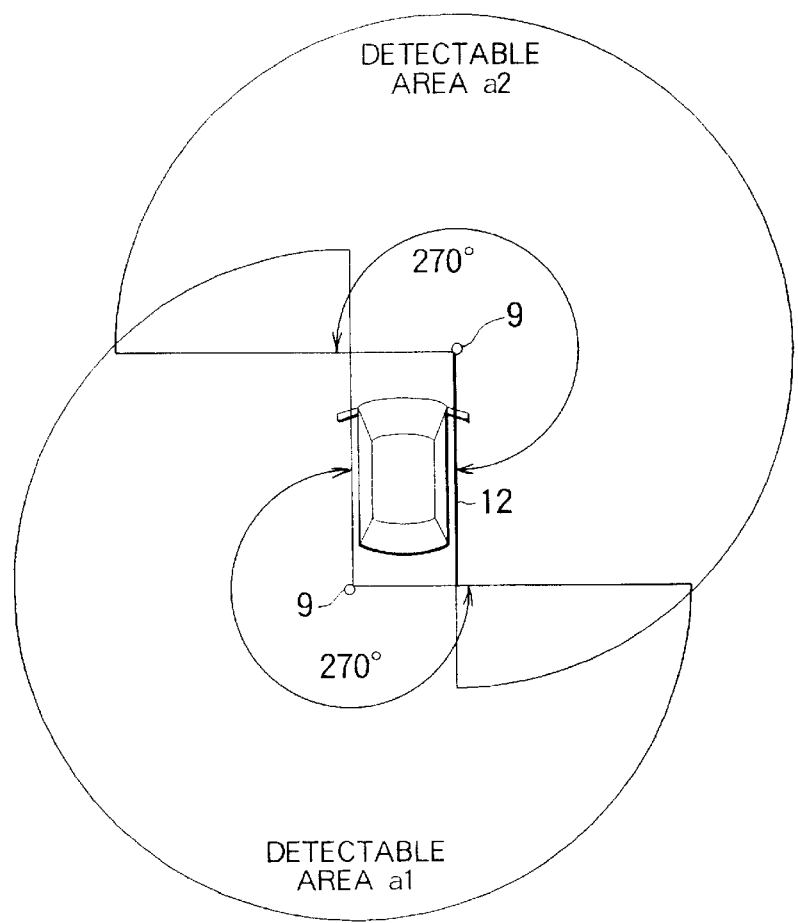
FIG. 21 is an explanatory view of Embodiment 9 of the present invention.

FIG. 21 shows the arrangement of a ninth embodiment. In this embodiment, a pair of optical radar apparatuses 9 are disposed on a front bumper and a rear bumper, respectively, at diagonally opposed corners of the vehicle. In FIG. 21, a first detectable area a is a detectable area of the optical radar apparatus 9 disposed at a rear corner on the front passenger's seat side, whereas a second detectable area a2 is a detectable area of the optical radar apparatus 9 disposed at the front corner on the driver's seat side, the overlap portion is a region in which an obstacle can be detected by using two optical radar apparatuses.

According to the ninth embodiment, in addition to the advantage of the eighth embodiment, the entire environment or surroundings of the subject vehicle 12 can be monitored by using a small number of optical radar apparatuses 9, as shown in FIG. 21.

In addition, since the two optical radar apparatuses are installed at such positions that a beam of light irradiated from one apparatus is not received directly by the other apparatus and vice versa, interference can be prevented.

Figure 22:
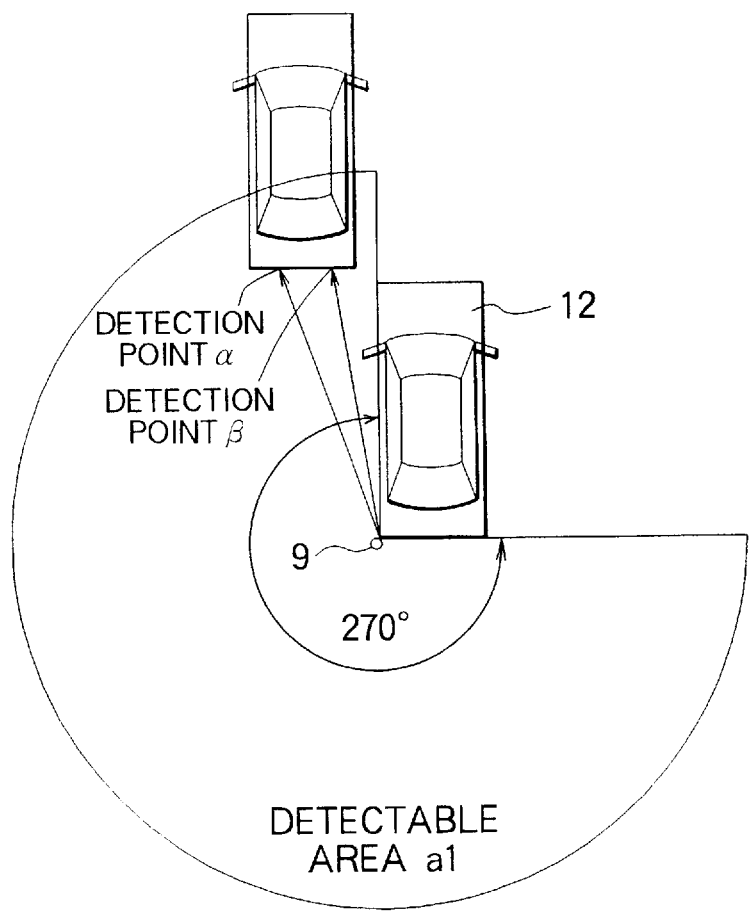
FIG. 22 is an explanatory view showing detection points of an optical radar apparatus.

FIG. 22 shows the manner of detecting an obstacle by using the above-mentioned vehicle environment monitoring system of FIG. 16 with the scanning amount for each trial being set to 10°. In this case, a vehicle is running in front of the front passenger's seat side of the subject vehicle 12 and detected at detection points α and β.

In the meantime, for accurately identifying a vehicle as an obstacle, it is desirable to detect at least two sides thereof. However, the detection points in FIG. 22 are only two points α and β, at both of which only the rear side of the subject vehicle is detected but not a lateral side thereof. Thus, it is difficult to judge whether an obstacle in front of the front passenger's seat side of the subject vehicle or similarly an obstacle behind the driver's seat side is a vehicle or not.

For solving this difficulty, diminishing the scanning amount of the optical radar apparatus 9 in FIG. 22 for each time is considered but the right side surface of the front vehicle is nearly parallel with the axis of beam of light irradiated from the optical radar apparatus 9 and accordingly it is difficult to irradiate a beam of light to the right side surface of the front vehicle.

Figure 23:
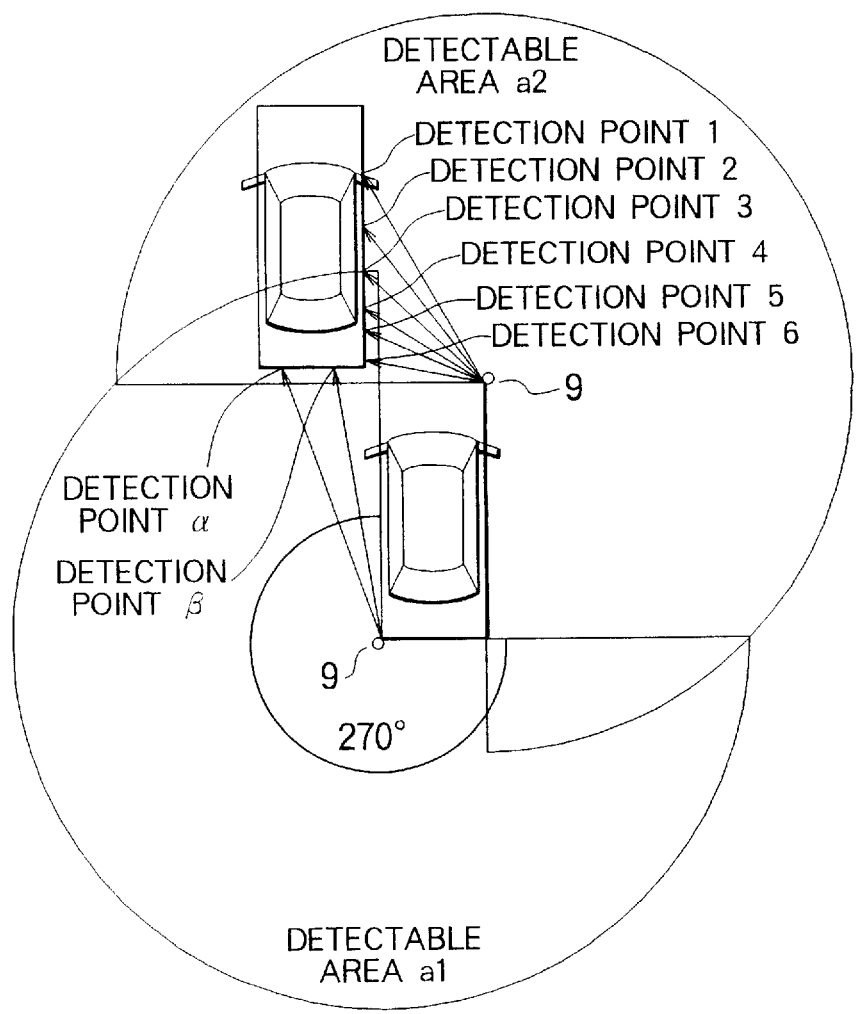
FIG. 23 is an explanatory view showing detection points of an optical radar apparatus.

On the contrary, the above problem can be solved according to the ninth embodiment without diminishing the scanning amount of the optical radar apparatus 9 for each time as shown in FIG. 23.

In FIG. 23, the detection points 1 to 6 are the points to be detected with the optical radar apparatus 9 disposed at the front corner of the subject vehicle on the driver's seat side and the scanning amount of this optical radar apparatus 9 for each time is set to 10°.

At these detection points, the rear side and a lateral side of a vehicle and therefore the L-shaped form peculiar to a vehicle can be identified. The vehicle environment monitoring system can estimate or determine the lengths of the respective sides in the L-shaped form on the basis of the scanning direction of each optical radar apparatus 9, the distance to the obstacle, the scanning amount for each time (here, 10°) and the position of each detection point.

In this manner, the vehicle environment monitoring system detects the form or configuration of an obstacle on the basis of information obtained from a pair of optical radar apparatuses 9, compares this detected configuration with a predetermined configuration, for example, an L-shaped configuration and identifies the obstacle as a vehicle if they completely or substantially coincide with each other. Alternatively, the form or configuration peculiar to a vehicle is not limited to the L-shaped form or configuration. For example, it can be judged from the detection of an edge that the obstacle is a vehicle.

Furthermore, if the scanning amount of each optical radar apparatus 9 for one time is diminished, identifying not only such a large obstacle as a vehicle but a smaller obstacle such as a person, a bicycle, a motorcycle, a ball or the like also becomes possible and consequently an alarm can be properly generated or a useless alarming can be prevented on the basis of this identification.

Although the L-shaped form or configuration was previously set for object identification in a case of a vehicle, but with respect to objects such as a person, a bicycle, a motorcycle and a ball, it is recommended to set reference forms or configurations for comparison peculiar to the respective objects.

Embodiment 10

A tenth embodiment of the present invention relates to performing control based on the above-described object identification.

Figure 24:
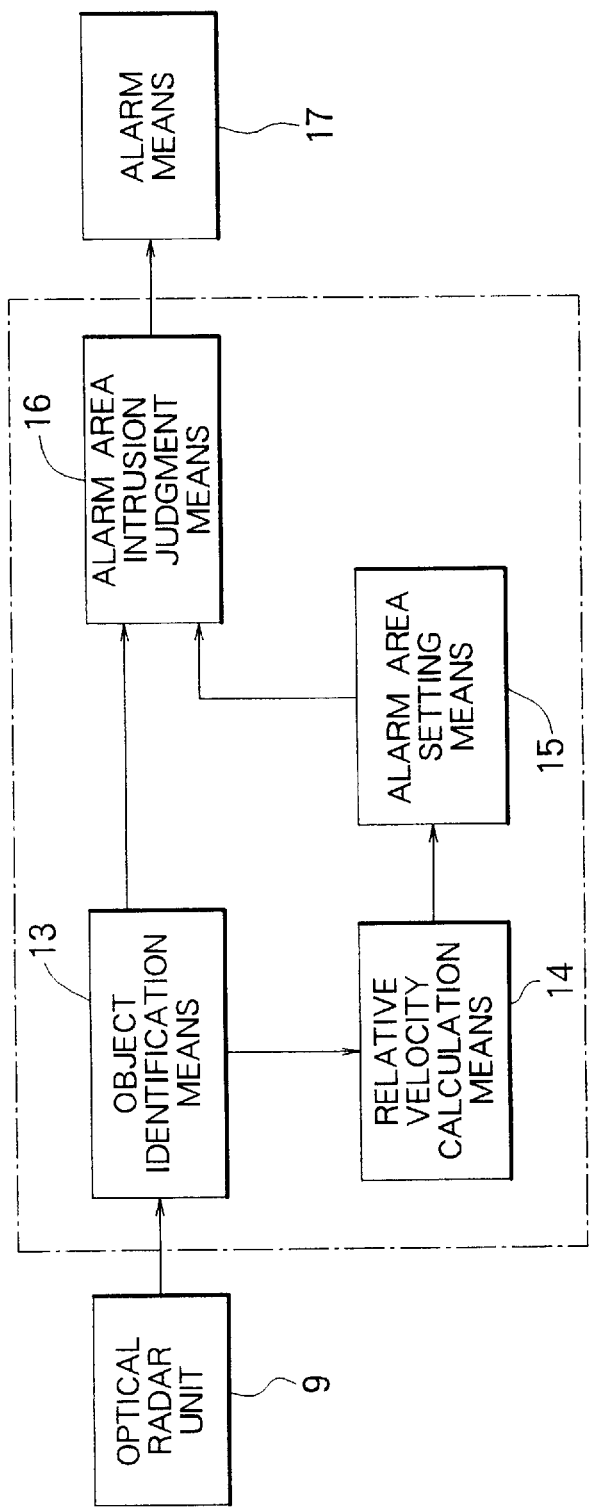
FIG. 24 is a block diagram showing an optical radar apparatus according to Embodiment 10 of the present invention.

FIG. 24 shows the arrangement of this embodiment.

An object identification means 13 detects the configuration and position of an obstacle on the basis of distance information and direction information obtained from the optical radar apparatus 9 and identifies what the obstacle is by comparing the detected configuration with a predetermined reference configuration as well. A relative-speed calculation means 14 calculates the relative speed of the obstacle to the subject vehicle on the basis of the previous and current outputs of the object identification means 13. An alarm area setting means 15 sets the area in which an alarm should be issued on the basis of the relative speed calculated by the relative-speed calculation means 14. An alarm area intrusion judgment means 16 judges whether an obstacle intrudes into the alarm area set by the alarm area setting means 15 or not and drives an alarm means 17 as necessary.

The object identification means 13, the relative-speed calculation means 14, the alarm area setting means 15 and the alarm area intrusion judgment means 16 together constitute a monitor means of the present invention, and the alarm area setting means 15 and the alarm area intrusion judgment means 16 together constitutes an alarm control means of the present invention.

Next, the operation of the tenth embodiment will be described.

Assume that the subject vehicle is running while monitoring the environment or surroundings thereof. The optical radar apparatus 9 outputs distance information and direction information with respect to obstacles for each predetermined scanning amount (e.g., 2°) to the object identification means 13 which performs the object identification in the manner mentioned above. Thus, after the optical radar apparatus 9 makes one turn or revolution, it is known what obstacle there is now in the environment or surroundings of the subject vehicle and where the obstacle is. Then, when the optical radar apparatus 9 makes a second-turn detection, the position of the obstacle shifts from the first-turn detected position due to the movement of the subject vehicle or the obstacle. The relative-speed calculation means 14 calculates the relative speed of the obstacle to the subject vehicle on the basis of the difference between the first-turn detected position and the second-turn detected position of the obstacle and the time elapsed from the first-turn detection to the second-turn detection.

In accordance with an output from relative-speed calculation means 14, the alarm area setting means 15 set the alarm area to a larger area than the standard one if the relative-speed is larger. Here, it is to be noted that the setting of the alarm area may be changed steplessly or at multiple steps depending on the relative-speed detected, or it may be switched depending on whether the detected relative-speed exceeds a predetermined value or not.

On the basis of the alarm area thus set by the alarm area setting means 15 and the current position information about the obstacle, the alarm area intrusion judgment means 16 judges whether the obstacle exists in the alarm area or not, and if so, it drives alarm means 17 to call driver's attention.

According to this embodiment, the safety is increased because use of the relative speed enables the vehicle environment monitoring to be implemented depending on the degree of danger.

Embodiment 11

An eleventh embodiment represents another example of executing the vehicle environment monitoring control depending on the degree of danger while taking advantage of the relative speed.

Figure 25:
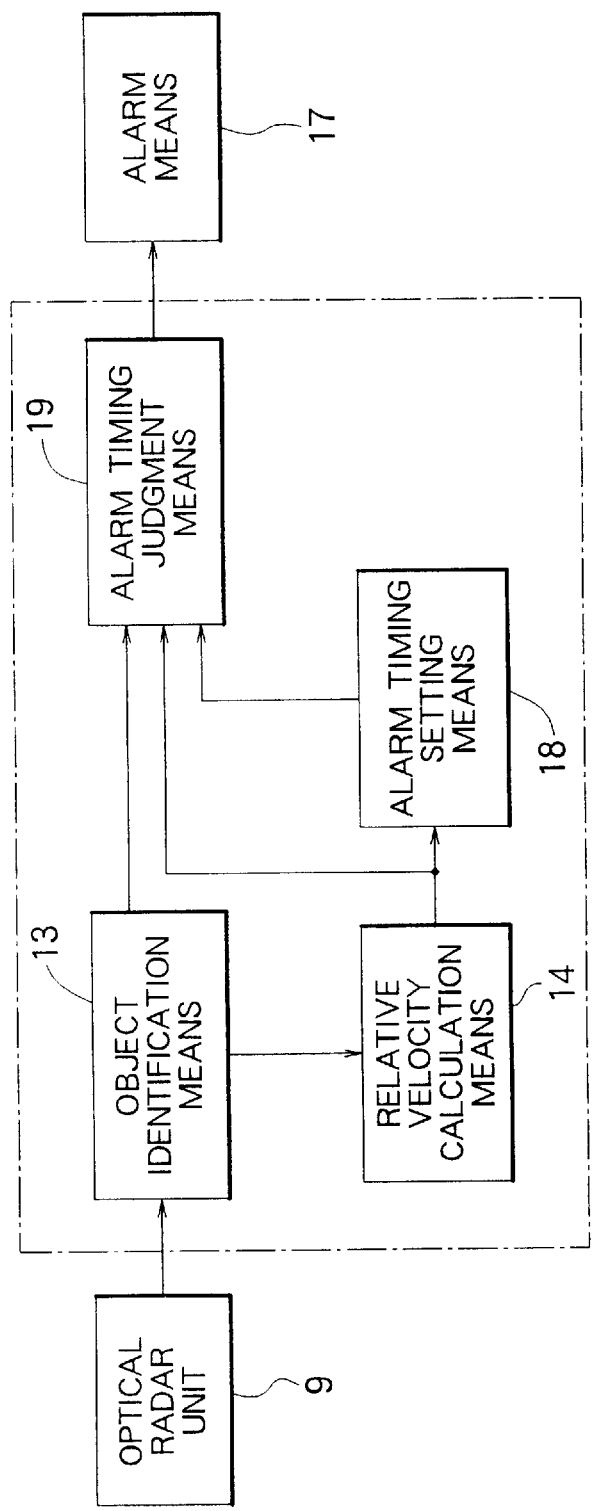
FIG. 25 is a block diagram showing an optical radar apparatus according to Embodiment 11 of the present invention.

FIG. 25 shows the arrangement of the eleventh embodiment. Upon receipt of an output of the relative-speed calculation means 14, an alarm timing setting means 18 calculates and sets the timing when an alarm should be issued upon receipt of an output of the alarm timing setting means 18 together with outputs of the object identification means 13 and the relative-speed calculation means 14, the alarm timing judgment means 19 judges whether the timing when an alarm should be issued has come or not yet arrived.

The object identification means 13, the relative-speed calculation means 14, the alarm timing setting means 18, and the alarm timing judgment means 19 together constitute a monitoring means of the present invention, and the alarm timing setting means 18 and the alarm timing judgment means 19 together constitute an alarm control means of the present invention.

The relative speed calculated as in the tenth embodiment is supplied to the alarm timing setting means 18. To drive the alarm means a predetermined time before the obstacle intrudes in the alarm area, the alarm timing setting means 18 sets the predetermined time on the basis of the relative speed. As the relative-speed increases, the predetermined time is set to be larger. Based on the current position of the obstacle obtained by the object identification means 13, the alarm timing judgment means 19 calculates the time required to until the relevant obstacle intrudes in the alarm area on the basis of the output of the relative-speed calculation means 14. The time required is compared with the predetermined time set by the alarm timing setting means 18. If the result of comparison reveals that the time required is less than or equal to the predetermined time, the alarm timing judgment means 19 calls driver's attention by driving the alarm means 17.

Thus, according to the eleventh embodiment, the larger the relative speed, the earlier an alarm can be issued so that the safety in driving of the vehicle is increased.

Embodiment 12

A twelfth embodiment relates to still another example of vehicle environment monitoring control to be performed by utilizing not only the relative speed of an obstacle but also the moving direction thereof.

Figure 26:
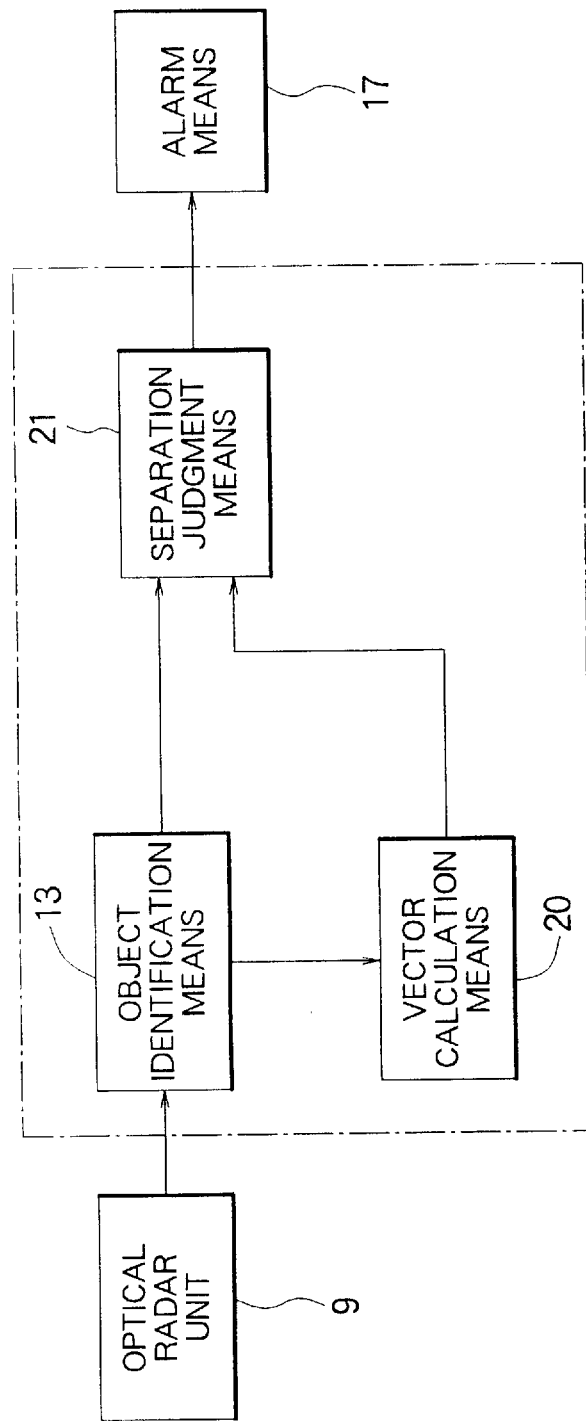
FIG. 26 is a block diagram showing an optical radar apparatus according to Embodiment 12 of the present invention.

FIG. 26 shows the arrangement of this embodiment. On the basis of the information for the first turn and that for the second turn of the optical radar apparatus 9, a vector calculation means 20 calculates a vector (relative speed and moving direction) of the obstacle. On the basis of the output of the vector calculation means 20 together with those of the object identification means 13, a separation judgment means 21 judges the relative moving direction of the obstacle to the subject vehicle and drives the alarm means at the instant when the obstacle has intruded in the alarm area if it is judged that the obstacle is moving in the direction to approach to and contact the subject vehicle. If it is judged that the obstacle is moving in the direction to recede from the subject vehicle, the separation judgment means 21 inhibits the issue of an alarm even if the obstacle intrudes in the alarm area.

The object identification means 13, the vector calculation means 20 and the separation judgment means 21 together constitute a monitoring means of the present invention, and the separation judgment means 21 constitutes an alarm control means of the present invention.

According to the twelfth embodiment, a useless alarm operation can be avoided because an alarm is not issued for all obstacles having intruded in the alarm area.

In addition, by combining this embodiment with the tenth embodiment or the eleventh embodiment, the driving safety can be further increased.

Embodiment 13

A thirteenth embodiment has the purpose of not only detecting an obstacle in a reliable manner but also of preventing mutual interference between optical radar apparatuses.

Figure 27:
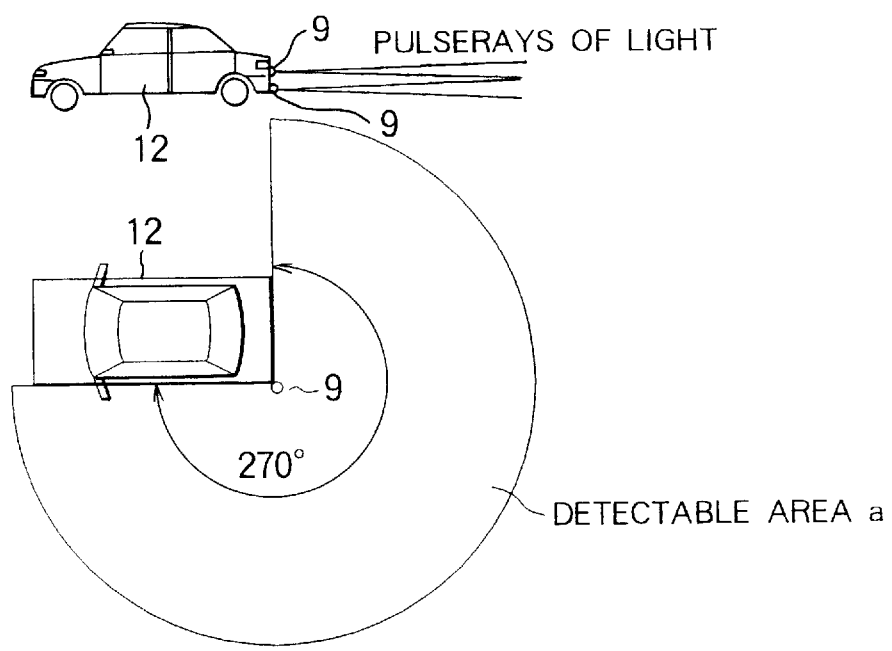
FIG. 27 is an explanatory view of Embodiment 13 of the present invention.

FIG. 27 shows an arrangement of this embodiment. In FIG. 27, two optical radar apparatuses 9 are disposed at different heights on the top and bottom of the bumper at the rear corner of the vehicle on the front passenger's seat side.

With the vehicle environment monitoring system arranged in this manner, any obstacle can be reliably detected even if it is hardly detected by using a single optical radar apparatus on account of color, configuration and height thereof, and moreover interference can be prevented because a beam of light irradiated from one optical radar apparatus 9 is not incident directly into the other and vice versa.

Figure 28:
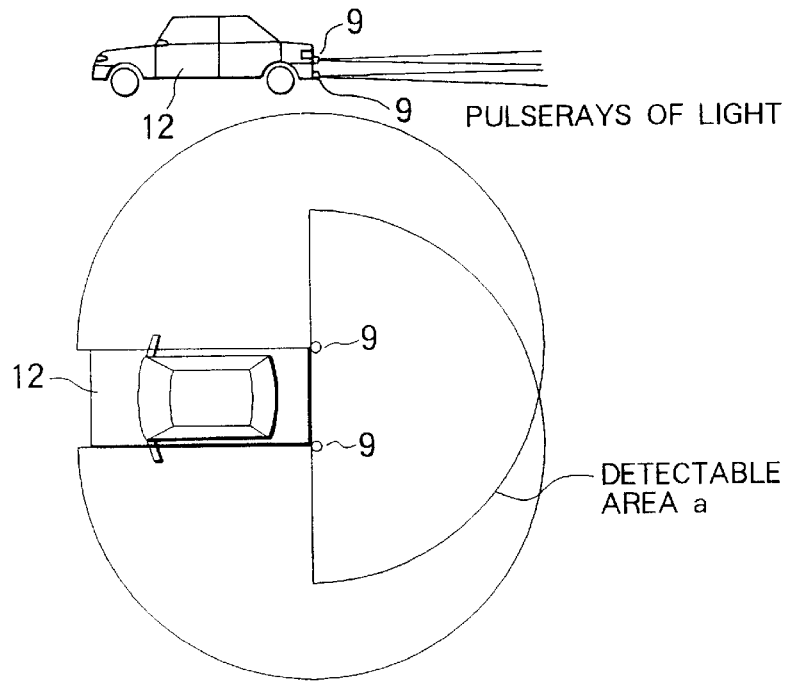
FIG. 28 is an explanatory view of another modification of Embodiment 13 of the present invention.

FIG. 28 shows an arrangement that two optical radar apparatuses 9 are disposed on a rear bumper at the respective rear corners of the vehicle, one on the top and the other on the bottom thereof.

With the vehicle environment monitoring system arranged in this manner, the aforesaid functions such as lane change alarm and rear alarm can be further improved because the overlap region in the detectable areas of a plurality of optical radar apparatuses can be widely obtained especially in the rear direction of the vehicle.

In the overlap region of the detectable areas for the optical radar apparatuses, beams of light irradiated from individual optical radar apparatuses differ in height from each other and each obstacle in the relevant region can be detected at two points having different heights.

Thus, obstacles can be reliably detected and moreover there is no fear of interaction between beams of light irradiated from two optical radar apparatuses because of a difference in the height of installation.

Figure 29:
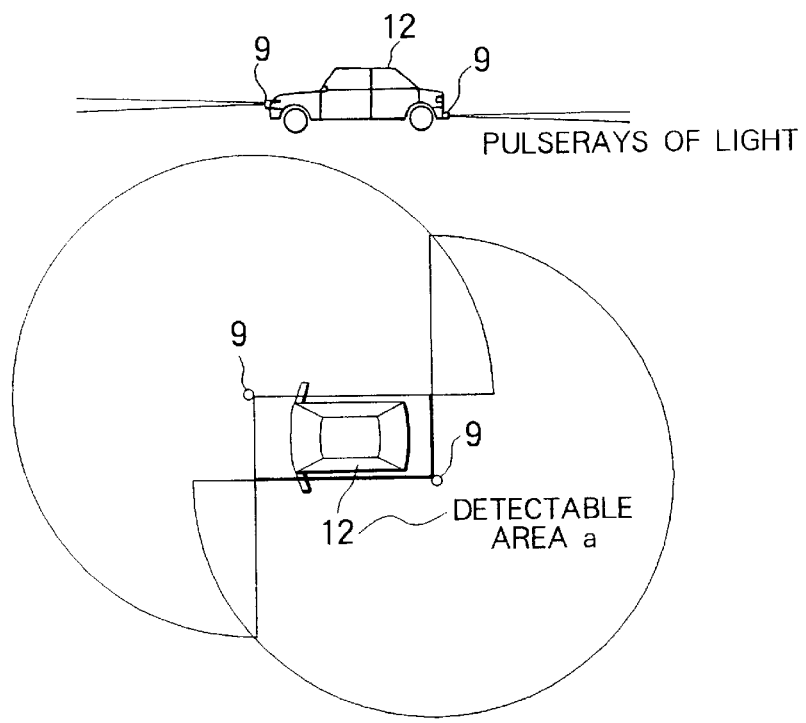
FIG. 29 is an explanatory view of a further modification of Embodiment 13 of the present invention.

FIG. 29 shows an arrangement that a pair of optical radar apparatuses are disposed on the front and rear bumpers at diagonally positioned corners of the vehicle, where one optical radar apparatus 9 is installed on the top of one of the bumpers and the other apparatus 9 on the bottom of the other bumper.

With the vehicle environment monitoring system arranged in this manner, an obstacle can be reliably detected in the entire region around the vehicle, and moreover the respective optical apparatus 9 do not interfere with each other.

In the overlap region of the detectable areas for the optical radar apparatuses 9 of FIG. 29, beams of light irradiated from individual optical radar apparatuses 9 toward an obstacle greatly differ not only in height but also in the direction of irradiation, so that the obstacle can be detected in a most reliable manner irrespective of the configuration thereof.

Figure 30:
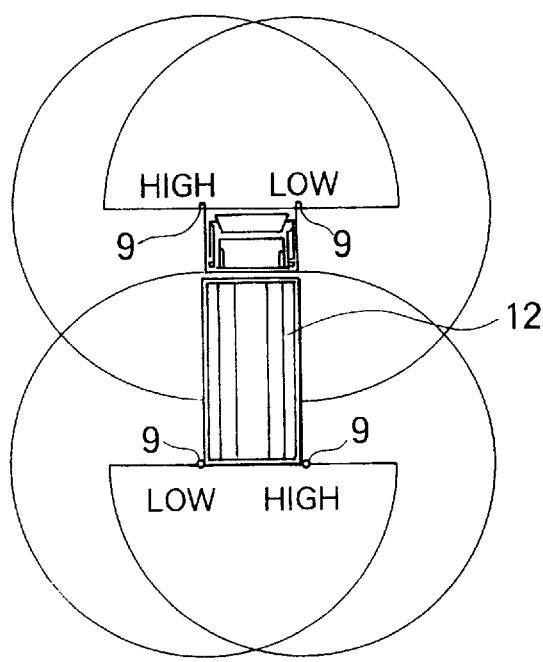
FIG. 30 is an explanatory view of a still further modification of Embodiment 13 of the present invention.

FIG. 30 shows an arrangement that four optical radar apparatuses 9 are disposed at all four corners of the subject vehicle 12, respectively. In this arrangement, two of the optical radar apparatuses 9 disposed at diagonally opposite corners of the vehicle are installed on the top of the front and rear bumpers, respectively, whereas the other two apparatuses 9 disposed at the other diagonally opposite corners are installed on the bottom of the front and rear bumpers, respectively.

As a result, the overlap regions in the detectable areas of the optical radar apparatuses 9 can be widely obtained, and moreover optical radar apparatuses never interfere mutually.

In the meantime, as shown in FIG. 30, in a case where the subject vehicle 12 is a large-sized one such as a truck, the entire region around the subject vehicle 12 cannot be detected by using the optical radar apparatuses 9 disposed at a pair of diagonally positioned corners as shown in FIG. 29 because the total length of the vehicle 12 is large. Thus, in this case, it is required to make the maximum detection distance of each optical radar apparatus longer.

For this reason, the transmission power of a laser diode has to be increased, or the size of a light receiving lens has to be enlarged, or countermeasures for suppressing noise in circuits are needed, so that the cost and volume of the entire system increase.

However, when four optical radar apparatuses are disposed as shown in FIG. 30, the whole region around the subject vehicle 12 can be detected by using the optical radar apparatuses 9 each having a normal (i.e., relatively small) power even with a large-sized vehicle.

Figure 31:
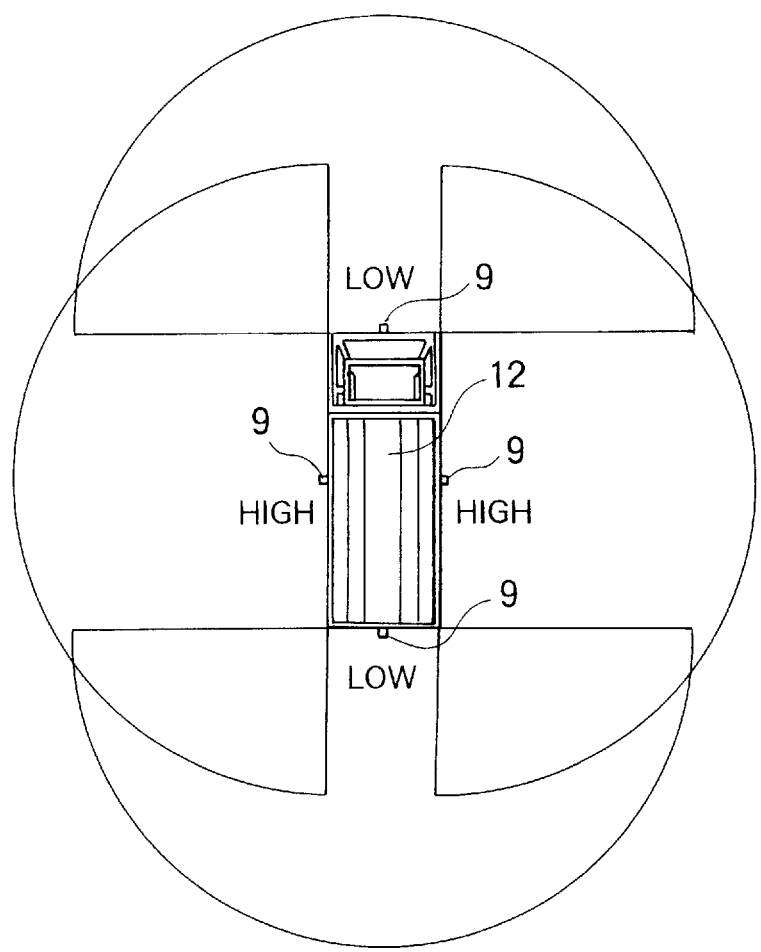
FIG. 31 is an explanatory view of a further modification of Embodiment 13 of the present invention.

FIG. 31 shows an arrangement that optical radar apparatuses 9 are disposed at all four sides of the subject vehicle 12. The optical radar apparatuses 9 disposed at the front side and the rear side of the vehicle are installed on the bottom of the respective bumpers, whereas the optical radar apparatuses 9 disposed at both lateral sides are installed on the top of the respective bumpers.

The vehicle environment monitoring system arranged in this manner is more advantageous in the outer appearance thereof than that shown in FIG. 30. That is, when viewing the subject vehicle 12 from a certain direction, e.g., from the front, the two optical radar apparatuses 9 disposed at the front side of the subject vehicle 12 differ in the height of installation and accordingly are unbalanced in the arrangement of FIG. 30, whereas the two optical radar apparatuses 9 disposed at both lateral sides of the subject vehicle 12 are seen at the equal height of installation and accordingly are well balanced in the arrangement of FIG. 31.

Furthermore, in the arrangement of FIG. 30, interference of radiated light occurs unless the two optical radar apparatuses disposed at each side differ in the height of installation as shown in FIG. 30, whereas the arrangement of FIG. 31 causes no problem of interference even if all optical radar apparatuses are installed at one and the same height.

Embodiment 14

In the above embodiments, it has been described that an obstacle can be reliably detected or identified in the overlap region of the detectable areas for optical radar apparatuses.

Embodiment 14 provides a vehicle environment monitoring system in which the entire region around the subject vehicle can be made the overlap regions of the detectable areas for optical radar apparatuses.

Figure 32:
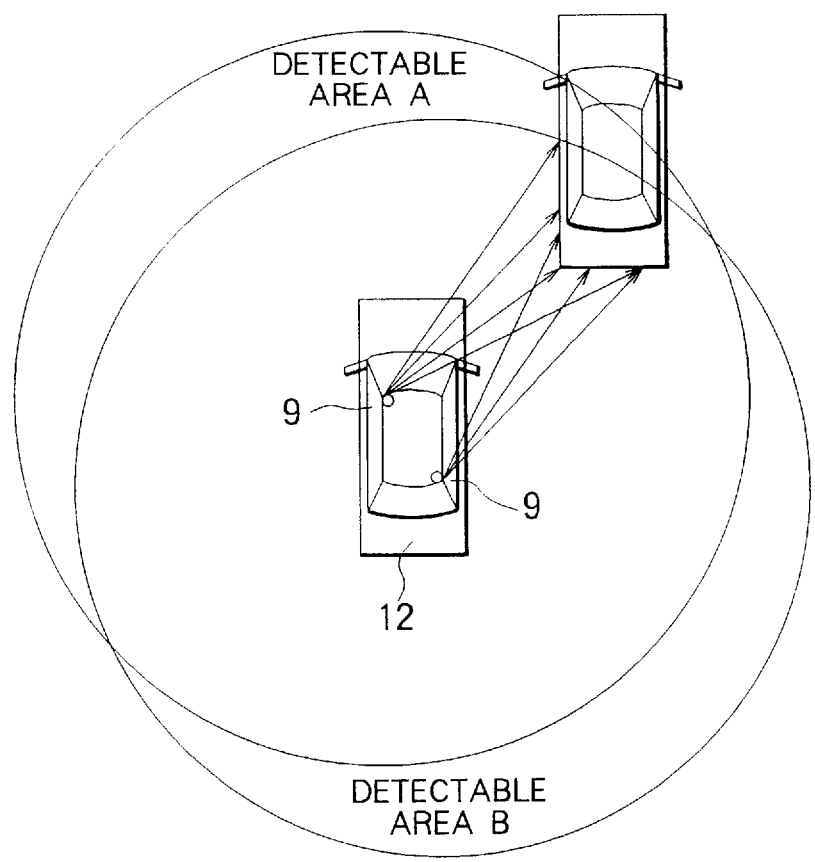
FIG. 32 is an explanatory view of Embodiment 14 of the present invention.

FIG. 32 shows an arrangement of a fourteenth embodiment. A pair of optical radar apparatuses 9 are disposed at diagonally positioned corners, respectively, of the ceiling of the subject vehicle 12. In FIG. 32, a detectable area A is for the optical radar apparatus disposed at a front corner of the ceiling of the vehicle on the front passenger's seat side, and a detectable area B is for the optical radar apparatus disposed at a rear corner of the ceiling on the driver's seat side.

With the fourteenth embodiment, as clearly seen from FIG. 32, the detectable areas for the two optical radar apparatuses overlap over the entire region around the subject vehicle 12.

Thus, a good detectability is manifested over the entire region around the subject vehicle 12. In addition, the above advantage is implemented by using two optical radar apparatuses and that simply and inexpensively.

Furthermore, in FIG. 32, two optical radar apparatuses are both disposed on the ceiling of the subject vehicle 12, but they may be both disposed on the floor of the subject vehicle 12, or they may be separately disposed, e.g., one on the ceiling and another on the floor. In essence, it is only necessary to dispose them at different heights of installation on the sites enabling detection of the entire region around the subject vehicle 12.

Incidentally, interference of both optical radar apparatuses has to be prevented. There are various measures for this, such as by making the heights of installation for the apparatuses different from each other as in some of the above embodiments, or by synchronizing the turning of two optical radar apparatuses in such a manner that the direction of radiation of one of the optical radar apparatuses is different from that of the other apparatus, e.g., one apparatus turns toward a direction away from the other apparatus while the other apparatus irradiates a beam of light to the one apparatus.

Embodiment 15

Figure 33:
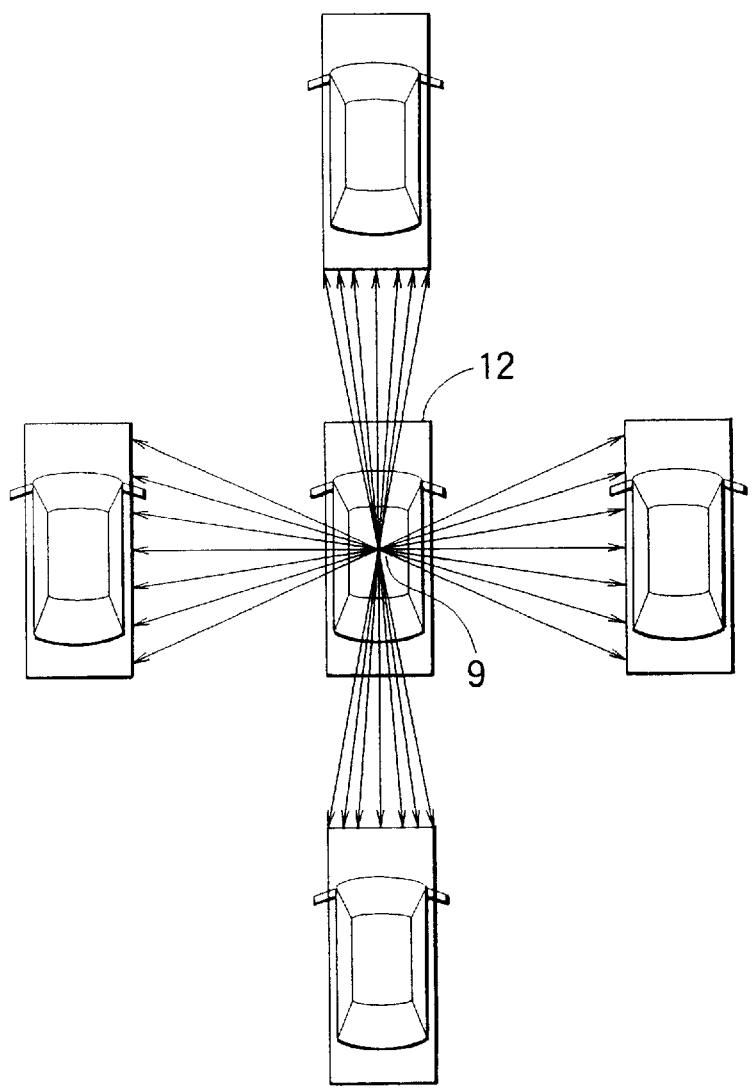
FIG. 33 is an explanatory view of Embodiment 15 of the present invention.

A fifteenth embodiment of the invention is an arrangement that the scanning amount for each time depends on the scanning direction of an optical radar apparatus. FIG. 33 shows the operation of this embodiment.

When the scanning amount for each time of an optical radar apparatus 9 is always constant, there is no problem for the lateral sides of a vehicle on account of a wide area in these sides. However, the number of detection points decreases for the front or rear side of a vehicle on account of a narrow area in this side.

Accordingly, in the fifteenth embodiment, it is detected by a scanning direction detection means to which direction an optical radar apparatus irradiates a beam of light, and the scanning amount for each time is made smaller within a predetermined angular range of the front and back directions than in other directions. As a result, a satisfactory number of detection points can be obtained, a disadvantage can be eliminated that the detectability of vehicles depends on the scanning direction.

On the contrary, since a sufficient number of detection points are obtained except the predetermined angular ranges of the front and back directions of the subject vehicle 12, the scanning amount for each time may be increased except the predetermined angular ranges.

Thus, memories for storing distance information and the like can be saved and the turning period of an optical radar apparatus can be diminished.

Especially, in the case of rainy or foggy weather, no sufficient number of detection points may be obtained due to attenuation or absorption of a light beam transmitting through the rainy or foggy atmosphere and consequently it becomes difficult to identify or detect an obstacle.

Accordingly, it may be arranged that, except in rainy and foggy weather, the scanning amount for each time is kept constant independently of the scanning direction of the optical radar apparatus 9, whereas the scanning amount for each time is controlled to vary depending on the scanning direction only in rainy or foggy weather.

Incidentally, for judgment of rainy or foggy weather, it is only necessary to detect application or turning-on of a predetermined load, such as a wiper or a fog lamp, related to that weather.

Embodiment 16

A sixteenth embodiment of the invention is constructed such that the scanning amount for each time is controlled depending on the running speed of the subject vehicle 12.

When the running speed of the subject vehicle is great, especially during running on an express way, an obstacle situated in the surroundings of the subject vehicle 12 approaches within an extremely short time. On the other hand, since an optical radar apparatus turns in succession at a predetermined scanning amount or angle and performs the scanning as described above, the scanning amount for one time is limited and there is a fear of the subject vehicle colliding with an obstacle before detection thereof during high-speed running.

Accordingly, the sixteenth embodiment is so arranged that, when a speed detection means for detecting the running speed of the subject vehicle detects a running speed above a predetermined speed (e.g., 80 km/h), the scanning amount for one time of an optical radar apparatus 9 is increased and the tuning or scanning period or interval is shortened.

Thus, according to the sixteenth embodiment, the surroundings of the subject vehicle 12 can be speedily monitored during high-speed running and consequently the driving safety is increased.

Embodiment 17

A seventeenth embodiment is constructed such that protective means is provided for preventing the staining or damaging of an optical radar apparatus 9.

Figure 34:
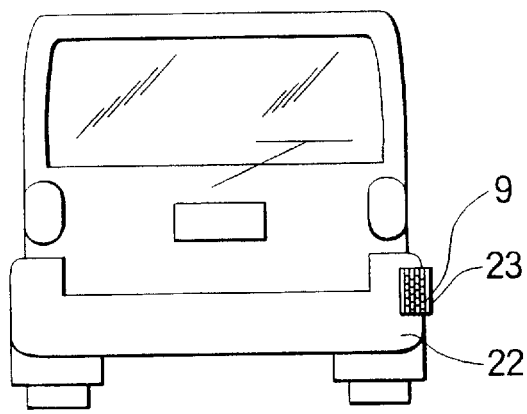
FIG. 34 is an explanatory view of Embodiment 17 of the present invention.

FIG. 34 shows an arrangement of this embodiment. The optical radar apparatus 9 is embedded in a bumper 22, and a shutter 23 is provided on the outer surface of this optical radar apparatus.

While the optical radar apparatus 9 is not used, the shutter 23 is closed to cover and protect the optical radar apparatus 9 from staining and damaging.

Figure 39:
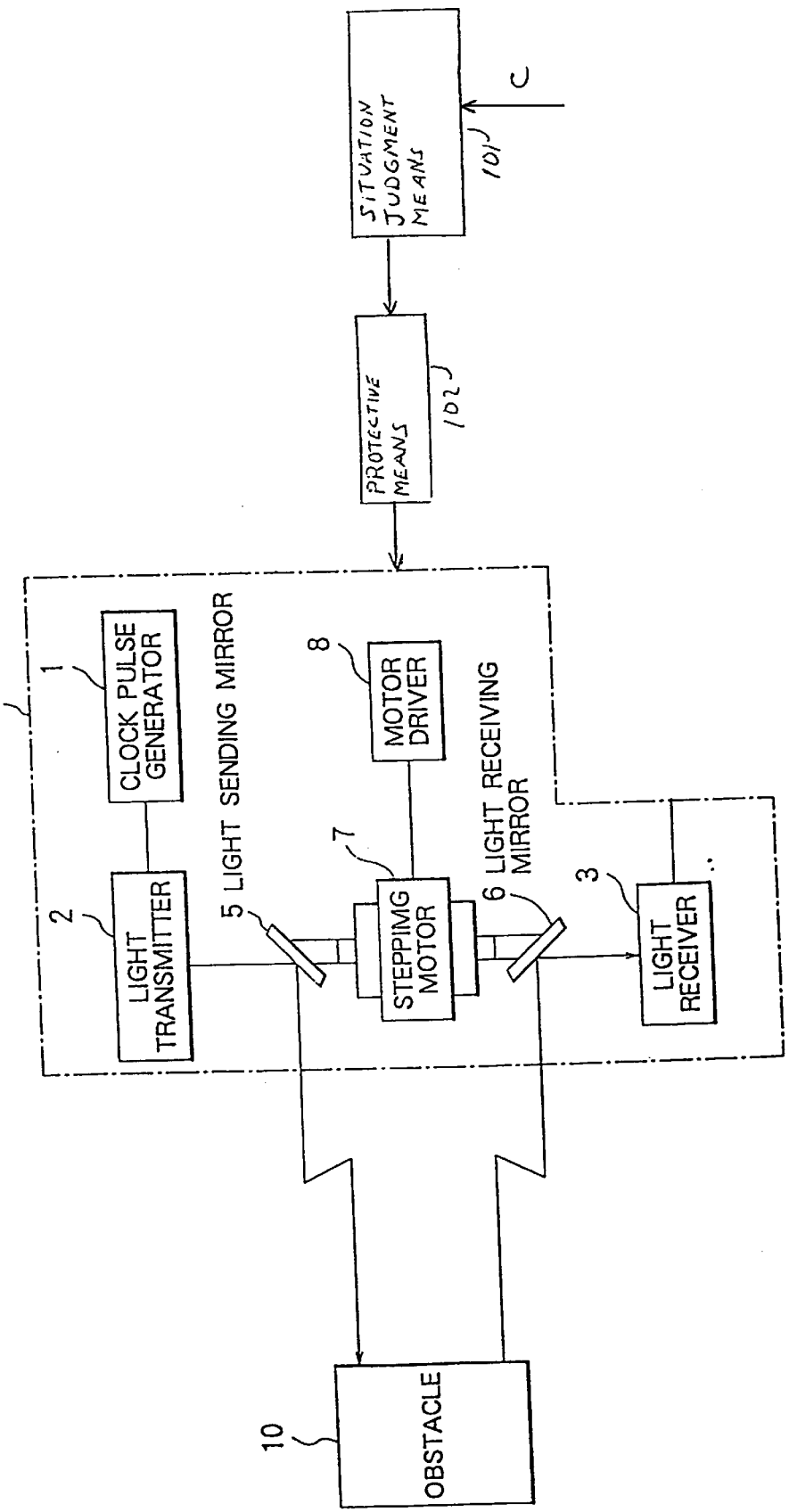
FIG. 39 is a block diagram of Embodiment 17 of the invention.
Figure 40:
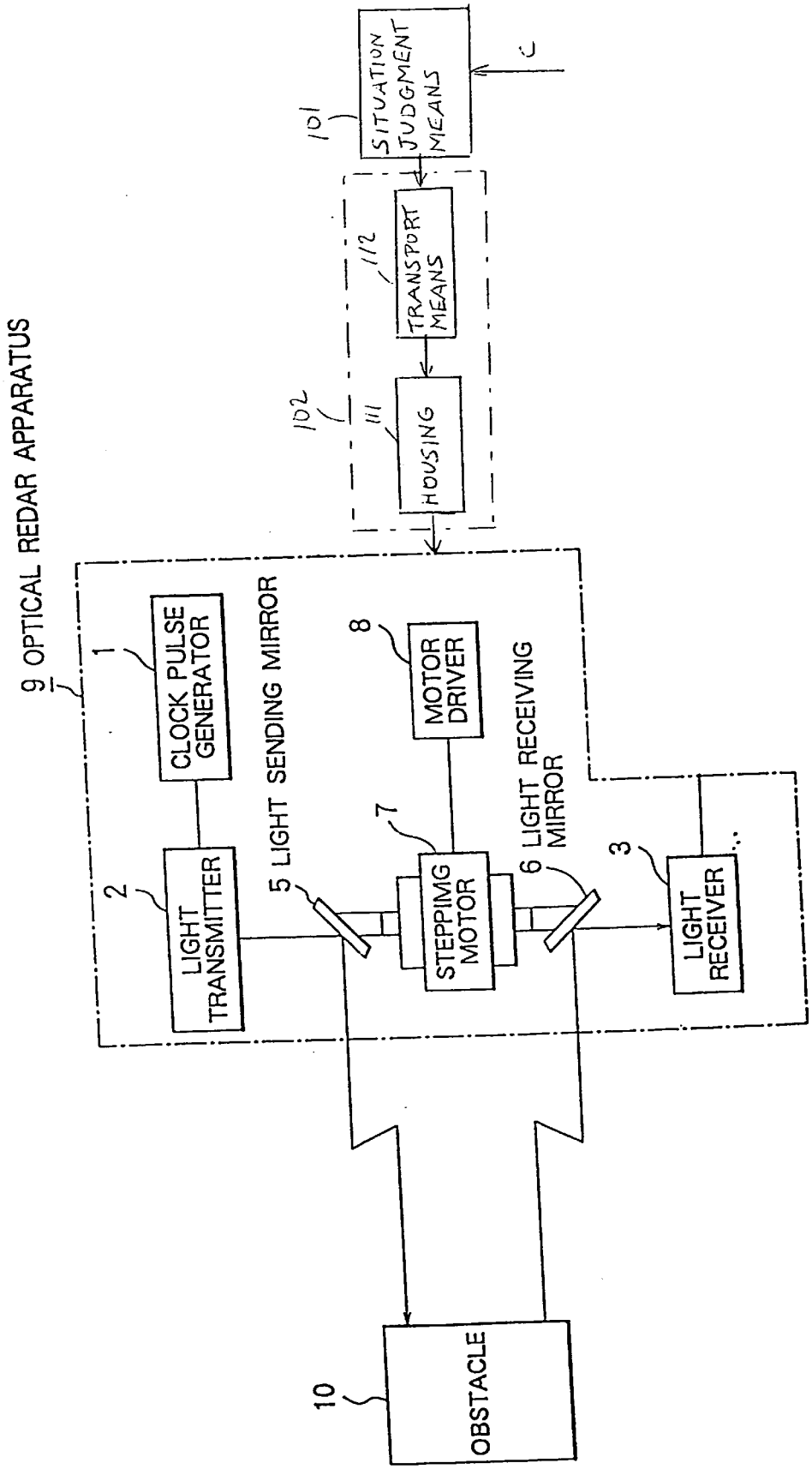
FIG. 40 is a block diagram of Embodiment 18 of the invention.

Incidentally, the used or unused state of the optical radar apparatus 9 is judged by a situation judgment means 101 (FIG. 39); not shown. On the basis of a signal (C) indicative of the situation of the subject vehicle 12, e.g., information that the speed detection means indicates zero for a long period of time or information that the engine is just stopped, the situation judgment means 101 judges the unused state of the optical radar apparatus and closes the shutter 23.

Embodiment 18

An eighteenth embodiment of the invention relates to an arrangement for housing an optical radar apparatus 9 during the unused time thereof.

Figure 35:
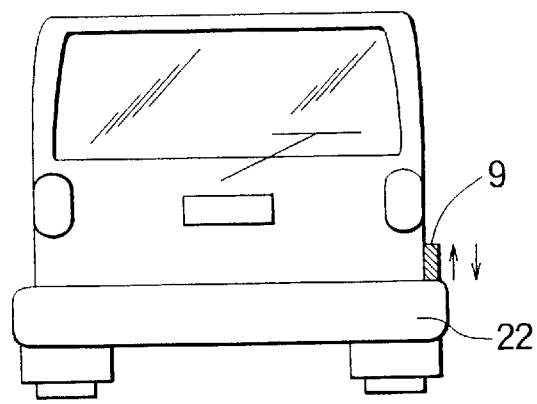
FIG. 35 is an explanatory view showing the operation of Embodiment 18 of the present invention.

As shown in FIG. 35, the optical radar apparatus 9 of this embodiment in use is projected from a bumper 22 and is received in a housing 111 provided at the bumper 22 during the unused time.

It is determined by the aforesaid situation judgment means 101 whether the optical radar apparatus 9 is to be housed or not. If judged to change the optical radar apparatus 9 from the unused to the used state, the apparatus 9 is projected by a transport means 112 such as a motor, and it is housed by the transport means if judged that the apparatus 9 is changed from the used to the unused state.

With the vehicle environment monitoring system arranged in this manner, as received in the housing 111 during stoppage of the vehicle, the optical radar apparatus 9 can be prevented not only from being stained or damaged but also from being toyed with and injured in the outer appearance thereof.

Figure 36:
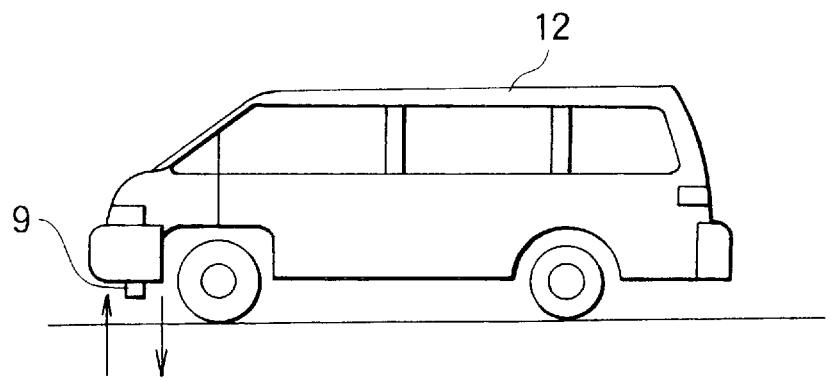
FIG. 36 is an explanatory view of another modification of Embodiment 18 of the present invention.

FIG. 36 shows a modification of the eighteenth embodiment.

An optical radar apparatus 9, disposed on the floor of the subject vehicle 12, is projected downward in use and is housed in an upside housing (not shown) provided on the floor during the unused time. This optical radar apparatus 9 is used to monitor the underside of the subject vehicle 12 prior to starting thereof and is housed during driving.

That is, upon detecting the engine start (e.g., turn-on of a key switch, turn-on of a starter, the number of engine revolutions per minute above a predetermined value or the like), a situation judgment means 101 actuates the transport means 112 to project the optical radar apparatus 9 downward from the floor of the subject vehicle 12 for monitoring the vehicle environment. Then, upon detecting start of the vehicle (e.g., driving speed above a predetermined value, turn-on of an accelerator switch or the like), the situation judgment means 101 again actuates the transport means 112 to house the optical radar apparatus 9 in the housing.

Thus, the optical radar apparatus 9 does not hinder the driving of the vehicle because it is received in the housing 111 during driving.

In addition, because of being projected only for a minimum period as required the optical radar apparatus 9 is less liable to be stained or damaged.

Embodiment 19

Figure 41:
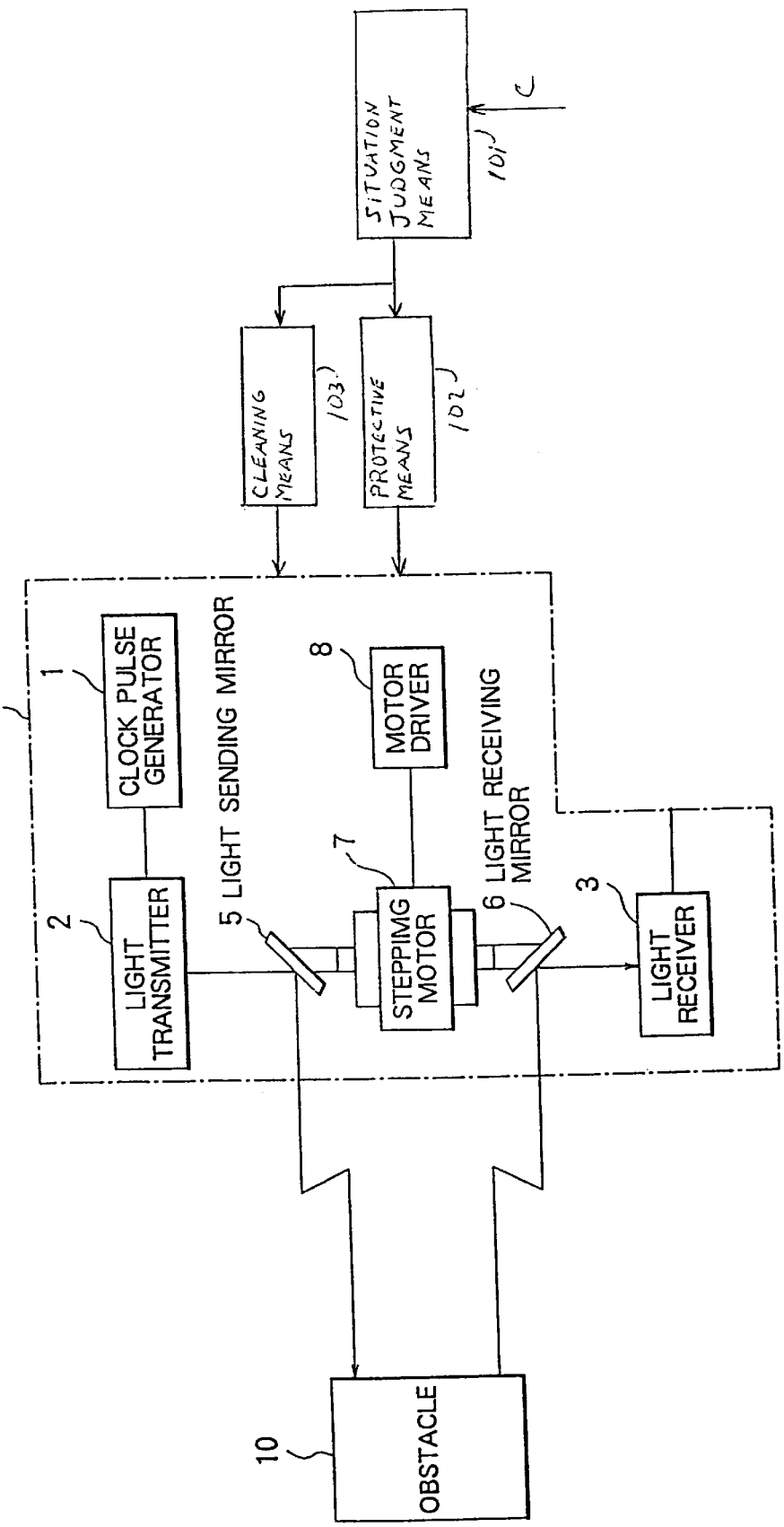

A nineteenth embodiment of the invention is intended to always obtain a good performance by cleaning an optical radar apparatus 9. A block diagram of the nineteenth embodiment is shown in FIG. 41.

Although in the above embodiments, the optical radar apparatus 9 is arranged to be housed or projected by using transport means, the nineteenth embodiment is arranged to perform the cleaning operation thereof by a cleaning means 103 simultaneously with housing and projecting operations.

That is, the cleaning means 103, made up of a ring-shaped rubber member, a brush or the like which is disposed inside the bumper and surrounds the optical radar apparatus 9, achieves the cleaning by contact with the outer surface of the optical radar apparatus 9 while the apparatus is transported into or out of the housing.

Furthermore, the cleaning means 103 may not be of the above structure but instead be constructed such that high-pressure liquid is jetted toward the apparatus 9 synchronously with the operation of the transport means.

What is claimed is:

1. A vehicle environment monitoring system comprising:
   an optical radar apparatus installed on a subject vehicle and including light transmission means for generating and irradiating a beam of light, scanning means for scanning the light beam in the area surrounding of the subject vehicle, and light receiving means for receiving the light beam irradiated from said light transmission means and reflected from an object;
   a stepper motor for driving said scanning means;
   driving means for driving said stepper motor so as to move said light beam by a predetermined angle;
   distance calculation means for calculating the distance to said obstacle, each time said stepper motor drives said scanning means by the predetermined angle, on the basis of the time elapsed from the light sending time to the light received time;
   scanning direction detection means for detecting the scanning direction of said optical radar apparatus; and
   monitoring means for monitoring the surroundings of the subject vehicle on the basis of the outputs from said distance calculation means and said scanning direction detection means to thereby control an alarm means on the basis of the calculated distance.

2. The vehicle environment monitoring system as set forth in claim 1 wherein said optical radar apparatus is disposed on the ceiling inside the subject vehicle.

3. The vehicle environment monitoring system as set forth in claim 1 wherein said optical radar apparatus is disposed on the ceiling of the front passenger's seat side of the subject vehicle.

4. The vehicle environment monitoring system as set forth in claim 1 wherein said optical radar apparatus is disposed on the floor of the subject vehicle.

5. The vehicle environment monitoring system as set forth in claim 1 wherein said optical radar apparatus is disposed at a corner of the subject vehicle.

6. The vehicle environment monitoring system as set forth in claim 5 wherein said corner of the subject vehicle is situated on the front passenger's seat side in the subject vehicle.

7. The vehicle environment monitoring system as set forth in claim 1 wherein said optical radar apparatus is disposed on a bumper of the subject vehicle.

8. The vehicle environment monitoring system as set forth in claim 2 wherein said optical radar apparatus is disposed on a floor of the subject vehicle.

9. The vehicle environment monitoring system as set forth in claim 1 wherein the optical axis of the beam of light irradiated from said optical radar apparatus is directed upward or downward relative to the position of installation thereof.

10. The vehicle environment monitoring system as set forth in claim 1 wherein the optical axis of the beam of light irradiated from said optical radar apparatus is oscillated vertically.

11. The vehicle environment monitoring system as set forth in claim 1 further comprising a plurality of optical radar apparatuses.

12. The vehicle environment monitoring system as set forth in claim 11 wherein at least two of said plurality of optical radar apparatuses are disposed at diagonally opposite corners, respectively, of the subject vehicle.

13. The vehicle environment monitoring system as set forth in claim 11 wherein said plurality of optical radar apparatuses are individually installed at different heights.

14. The vehicle environment monitoring system as set forth in claim 1 wherein said monitoring means comprises object identification means for detecting the configuration of the object on the basis of said distance information and said direction information obtained by said optical radar apparatus to thereby identify the object through comparison of said detected configuration with a predetermined configuration.

15. The vehicle environment monitoring system as set forth in claim 14 wherein said monitoring means further comprises:
   relative-speed calculation means for calculating a relative speed between the obstacle and the subject vehicle on the basis of a difference between a previous position and a current position of the object detected by said object identification means; and
   alarm control means for controlling said alarm means on the basis of the thus calculated relative speed.

16. The vehicle environment monitoring system as set forth in claim 15 wherein said alarm control means comprises:
   alarm area setting means for setting, on the basis of the relative speed, an alarm area in which an alarm should be issued; and
   alarm area intrusion judgment means for judging whether an object is present within said alarm area and for driving said alarm means if it is judged that an object is present within said alarm area.

17. The vehicle environment monitoring system as set forth in claim 15 wherein said alarm control means comprises:
   alarm timing setting means for setting a predetermined first time on the basis of the relative speed in such a manner as to drive said alarm means said predetermined first time before an object intrudes into said alarm area; and
   alarm timing judgment means for calculating a second time taken until an object intrudes said alarm area on the basis of said relative speed and the position of the object, and for driving said alarm means if the second time is less than said predetermined first time.

18. The vehicle environment monitoring system as set forth in claim 14 wherein said monitoring means further comprises:
   vector calculation means for calculating, on the basis of the difference between the previous and current positions of the object detected by said object identification means, a vector (distance and direction) of said object in said alarm area relative to the subject vehicle; and
   alarm control means for controlling said alarm means on the basis of the thus calculated vector.

19. The vehicle environment monitoring system as set forth in claim 18 wherein said alarm control means comprises separation judgment means for judging the relative moving direction of said object relative to the subject vehicle and inhibiting the driving of said alarm means if it is judged that the relative moving direction of said object relative to the subject vehicle is a direction away from the subject vehicle.

20. The vehicle environment monitoring system as set forth in claim 11 wherein said plurality of optical radar apparatuses are individually installed at different heights on the ceiling or the floor of the subject vehicle.

21. The vehicle environment monitoring system as set forth in claim 1 wherein said driver means controls the predetermined angle by which said stepper motor drives said scanning means on the basis of the output from said scanning direction detection means.

22. The vehicle environment monitoring system as set forth in claim 21 further comprising load detection means for detecting the application of a predetermined load and generating a corresponding output, said driver means controlling the predetermined angle by which said stepper motor drives said scanning means in accordance with the output of said scanning direction detection means if said predetermined load is applied.

23. The vehicle environment monitoring system as set forth in claim 1 further comprising speed detection means for detecting a speed of the subject vehicle and generating a corresponding output, said driver means controlling scanning amount of the light beam from said light transmission the predetermined angle by which the stepper motor drives said scanning means in accordance with the output of said speed detection means.

24. The vehicle environment monitoring system as set forth in claim 23 wherein said driver means augments the predetermined angle by which said stepper motor drives said scanning means in comparison with that for a speed less than a predetermined value if the speed detection means detects a vehicle speed greater than the predetermined value.

25. A vehicle environment monitoring system comprising:
an optical radar apparatus installed on a subject vehicle and including light transmission means for generating and irradiating a beam of light, scanner means for scanning the light beam in the surroundings of the subject vehicle, and light receiving means for receiving the light beam irradiated from said light transmission means and reflected from an object;
distance calculation means for calculating the distance to said obstacle on the basis of the time elapsed from the light sending time to the light received time;
scanning direction detection means for detecting the scanning direction of said optical radar apparatus: and
monitoring means for monitoring the surroundings of the subject vehicle on the basis of the outputs from said distance calculation means and said scanning direction detection means to thereby control an alarm means on the basis of the calculated distance;
wherein the optical axis of the beam of light irradiated from said optical radar apparatus is oscillated vertically; and wherein said scanner means comprises:
a reflective member pivotally supported on a support shaft in an inclined manner for reflecting the beam of light from said transmission means;
drive means for driving said support shaft together with said reflective member to rotate;
a tubular guide member disposed near said reflective member with said support shaft arranged therein, said tubular member having one end in a corrugated configuration with which said reflective member is in butting engagement; and
biasing means disposed between said reflective member and said tubular guide for biasing said reflective member toward the corrugated end of said tubular guide member.

26. A vehicle environment monitoring system comprising:
a plurality of optical radar apparatuses installed on a subject vehicle, each of said optical radar apparatuses including light transmission means for generating and irradiating a beam of light, scanner means for scanning the light beam in the surroundings of the subject vehicle, and light receiving means for receiving the light beam irradiated from said light transmission means and reflected from an object;
distance calculation means for calculating the distance to said obstacle on the basis of the time elapsed from the light sending time to the light received time;
scanning direction detection means for detecting the scanning direction of said optical radar apparatuses; and
monitoring means for monitoring the surroundings of the subject vehicle on the basis of the outputs from said distance calculation means and said scanning direction detection means to thereby control an alarm means on the basis of the calculated distance;
wherein said monitoring means comprises object identification means for identifying said object on the basis of distance information and direction information obtained by said plurality of optical radar apparatuses.

27. A vehicle environment monitoring system comprising:
an optical radar apparatus installed on a subject vehicle and including light transmission means for generating and irradiating a beam of light, scanner means for scanning the light beam in the surroundings of the subject vehicle, and light receiving means for receiving the light beam irradiated from said light transmission means and reflected from an object;
distance calculation means for calculating the distance to said obstacle on the basis of the time elapsed from the light sending time to the light received time;
scanning direction detection means for detecting the scanning direction of said optical radar apparatus; and
monitoring means for monitoring the surroundings of the subject vehicle on the basis of the outputs from said distance calculation means and said scanning direction detection means to thereby control an alarm means on the basis of the calculated distance;
wherein said scanner means controls a scanning amount of the light beam from said light transmission means on the basis of the output from said scanning direction detection means; and
wherein said scanner means diminishes the scanning amount for the front-to-rear direction of the subject vehicle in comparison with that for the right-to-left direction of the subject vehicle.

28. A vehicle environment monitoring system comprising:
an optical radar apparatus installed on a subject vehicle and including light transmission means for generating and irradiating a beam of light, scanner means for scanning the light beam in the surroundings of the subject vehicle, and light receiving means for receiving the light beam irradiated from said light transmission means and reflected from an object;
situation judgment means for judging whether said optical radar apparatus is in a used state or an unused state; and
protective means adapted to be controlled by said situation judgment means for protecting said optical radar apparatus if it is judged that said optical radar apparatus is in the unused state.

29. The vehicle environment monitoring system as set forth in claim 28 wherein said protective means comprises a shutter for covering said optical radar apparatus.

30. The vehicle environment monitoring system as set forth in claim 28 wherein said protective means comprises:

a housing for receiving said optical radar apparatus; and transport means for transporting said optical radar apparatus into and out of said housing.

31. The vehicle environment monitoring system as set forth in claim 28 further comprising cleaner means being operable in synchronization with the operation of said protective means for cleaning said optical radar apparatus.

* * * * *